(12) United States Patent
Nakamura

(10) Patent No.: US 11,577,194 B2
(45) Date of Patent: Feb. 14, 2023

(54) DESICCANT FITTING

(71) Applicant: Yazaki Energy System Corporation, Tokyo (JP)

(72) Inventor: Takuju Nakamura, Tokyo (JP)

(73) Assignee: YAZAKI ENERGY SYSTEM CORPORATION, Tokyo (JP)

( * ) Notice: Subject to any disclaimer, the term of this patent is extended or adjusted under 35 U.S.C. 154(b) by 320 days.

(21) Appl. No.: 16/911,987

(22) Filed: Jun. 25, 2020

(65) Prior Publication Data

US 2020/0324245 A1    Oct. 15, 2020

Related U.S. Application Data

(63) Continuation of application No. PCT/JP2018/045331, filed on Dec. 10, 2018.

(30) Foreign Application Priority Data

Dec. 26, 2017   (JP) .............................. JP2017-248819

(51) Int. Cl.
| | | |
|---|---|---|
| *B01D 53/28* | (2006.01) | |
| *E04B 1/70* | (2006.01) | |
| *E04B 1/76* | (2006.01) | |
| *F24F 3/14* | (2006.01) | |

(52) U.S. Cl.
CPC ............... *B01D 53/28* (2013.01); *E04B 1/70* (2013.01); *E04B 1/76* (2013.01); *F24F 3/1411* (2013.01); *B01D 2257/80* (2013.01)

(58) Field of Classification Search
None
See application file for complete search history.

(56) References Cited

U.S. PATENT DOCUMENTS

| | | | | |
|---|---|---|---|---|
| 3,990,431 A | * | 11/1976 | Mazzoni ............... | F24S 10/504 |
| | | | | 126/712 |
| 6,751,964 B2 | | 6/2004 | Fischer | |
| 8,328,904 B2 | | 12/2012 | Griffiths et al. | |
| 8,854,736 B2 | * | 10/2014 | Yoshida ................... | B32B 7/12 |
| | | | | 359/359 |
| 2005/0204914 A1 | | 9/2005 | Boutall | |
| 2011/0265855 A1 | * | 11/2011 | Baruchi .............. | H01L 31/0547 |
| | | | | 136/246 |
| 2012/0222722 A1 | * | 9/2012 | Baruchi .............. | H01L 31/0547 |
| | | | | 136/246 |

(Continued)

FOREIGN PATENT DOCUMENTS

| | | |
|---|---|---|
| CN | 2357276 Y | 1/2000 |
| CN | 102742031 A | 10/2012 |
| JP | 2006-320635 A | 11/2006 |

*Primary Examiner* — Joshua K Ihezie
(74) *Attorney, Agent, or Firm* — Sughrue Mion, PLLC

(57) ABSTRACT

A desiccant window includes: a transparent triangular prism that is disposed between first and second plates, is configured of a first side along the first glass and second and third sides which have an angle with respect to the first side in a sectional view, and forms (three) types of optical paths; and a desiccant heat receiving unit that has hygroscopicity and is disposed between the first and second plates, is installed on the second side of the triangular prism), and is received solar heat and releases absorbed moisture by heating using the received heat received.

16 Claims, 14 Drawing Sheets

(56) References Cited

U.S. PATENT DOCUMENTS

2014/0160383 A1\* 6/2014 Shikii ................ G02B 26/0841
　　　　　　　　　　　　　　　　　　　　　　349/1
2014/0182679 A1\* 7/2014 Rosenberg ................ E06B 9/24
　　　　　　　　　　　　　　　　　　　　　　359/359

\* cited by examiner

FIG. 4A
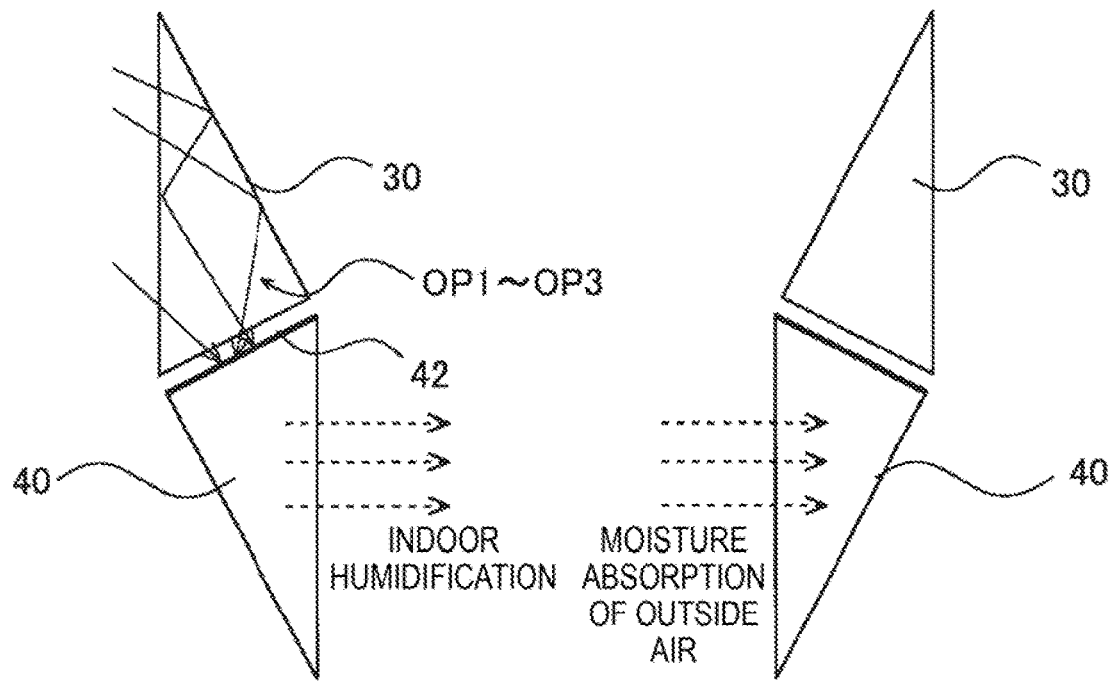
FIG. 4B
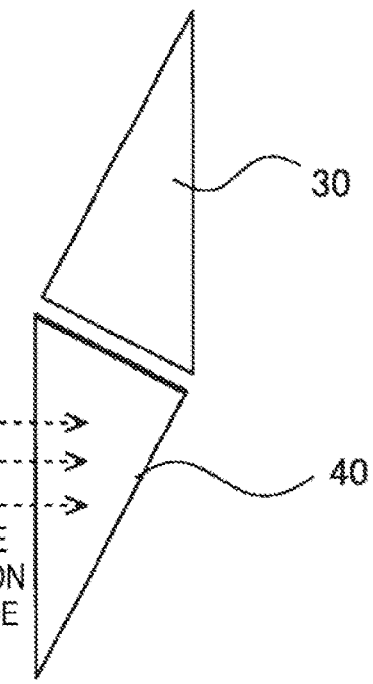
FIG. 4C
FIG. 4D
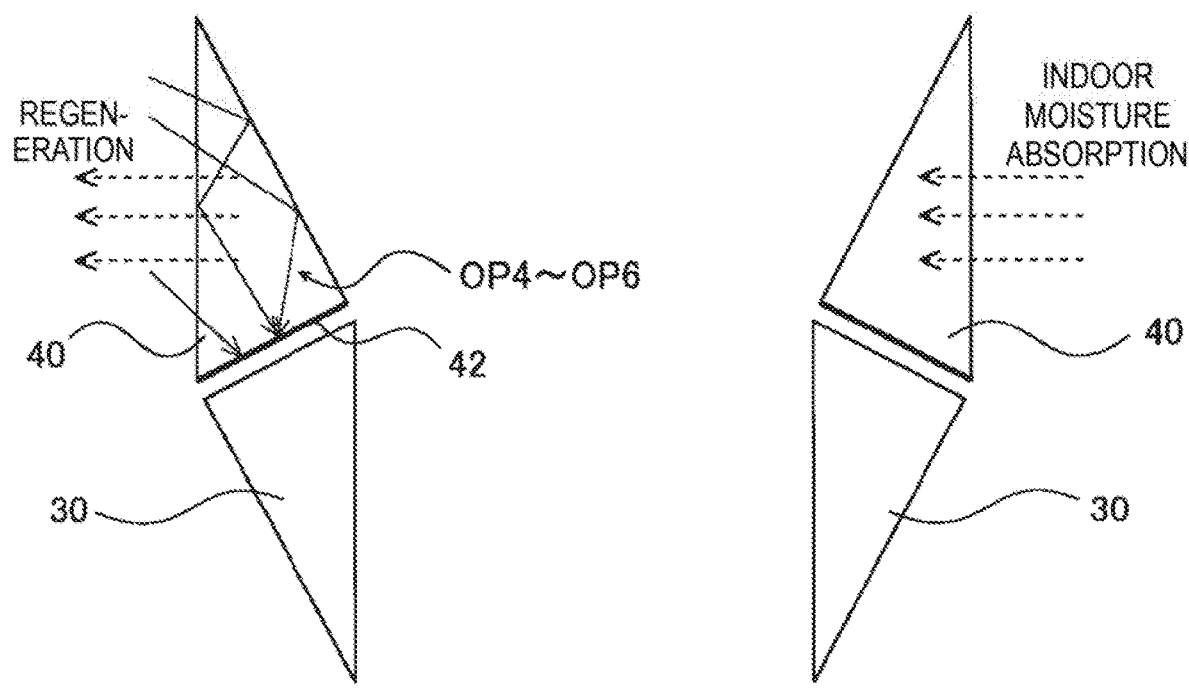
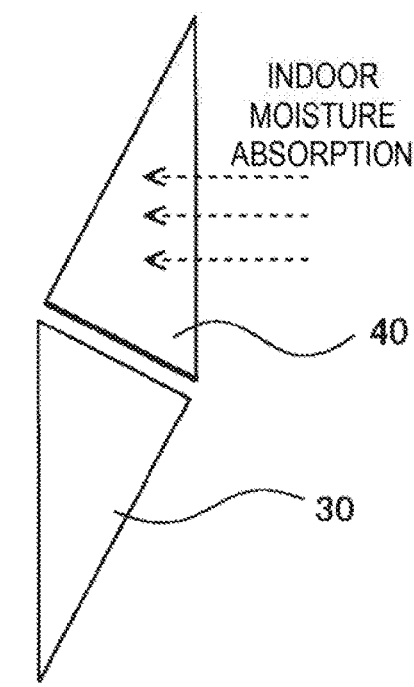

DESICCANT FITTING

CROSS REFERENCE TO RELATED APPLICATIONS

This application is a continuation of PCT application No. PCT/JP2018045331, which was filed on Dec. 10, 2018 based on Japanese patent application 2017-248819 filed on Dec. 26, 2017, whose contents are incorporated herein by reference. Also, all the references cited herein are incorporated as a whole.

BACKGROUND OF THE INVENTION

1. Technical Field

The present invention relates to a desiccant fitting.

2. Background Art

In the related art, a desiccant system having a moisture absorbent transports both indoor air and the atmosphere by a duct or the like, and performs moisture absorption and regeneration with the moisture absorbent in a mechanical device. For the reason, the transport power and the equipment cost become excessive.

Therefore, a moisture absorbing structure (desiccant fitting) that can be used as a fitting has been proposed (refer to Patent Literature 1). The moisture absorbing structure includes a wall body having an effect of absorbing moisture and deodorizing and glass that forms an air layer with the wall body on the outdoor side of the wall body, by making the air layer communicate with the indoor side, the indoor is dehumidified, and by making the air layer communicate with the outdoor side, the moisture is released and the wall body is regenerated.

CITATION LIST

Patent Literature

[Patent Document 1] JP-A-2006-320635

SUMMARY

However, since the desiccant fitting described in Patent Literature 1 irradiates the wall body with the sunlight as it is, which is transmitted through the glass, to perform regeneration, the regeneration efficiency cannot be said to be high at all, and it is desired to improve the indoor air conditioning effect (humidity control effect or temperature control effect).

The present invention has been made to solve such a problem, and an object of the present invention is to provide a desiccant fitting that can improve the indoor temperature control effect.

Solution to Problem

A desiccant fitting according to the present invention includes: a first plate, a second plate, a desiccant element, a triangular prism, and a solar heat receiving unit. The desiccant element has a hygroscopicity and is disposed between the first and second plates. The triangular prism is transparent, is disposed between the first and second plates, is configured of a first side along the first plate and second and third sides which have an angle with respect to the first side in a sectional view, and forms three types of optical paths with respect to sunlight incident through the first plate. The three types of optical paths are for sunlight that directly reaches the second side, sunlight that is totally reflected on the third side and reaches the second side, and sunlight that reaches the second side after being totally reflected on the third side and the first side in order, with respect to sunlight incident through the first plate. The solar heat receiving unit is installed on the second side that is a side on a lower side out of the second and third sides of the triangular prism, and is received solar heat and releases absorbed moisture by heating the desiccant element using the received heat.

According to the present invention, since the triangular prism that forms three types of optical paths is provided, the solar heat receiving unit can efficiently receive the solar heat. In addition, since the desiccant element is heated by the solar heat receiving unit to release the absorbed moisture, the indoor humidification due to the release of the moisture and the discarding (that is, regeneration) of the absorbed moisture can be performed more efficiently. Therefore, it is possible to provide a desiccant fitting that can improve the indoor air conditioning effect.

BRIEF DESCRIPTION OF THE DRAWINGS

FIGS. 4A to 4D are views for describing an operation of the desiccant window according to the first embodiment, FIG. 4A illustrates a first state, FIG. 4B illustrates a second state, FIG. 4C illustrates a third state, and FIG. 4D illustrates a fourth state.

DETAILED DESCRIPTION OF EMBODIMENTS

Hereinafter, the present invention will be described along with preferred embodiments. In addition, the present invention is not limited to the embodiments which will be described below, and appropriate changes can be made within a range that does not depart from the gist of the present invention. In addition, in the embodiments described below, some components are not illustrated or described, but regarding the details of the omitted technologies, it is needless to say that a publicly-known or well-known technology is appropriately applied within a range that does not cause inconsistency with the content described below.

Figure 1:
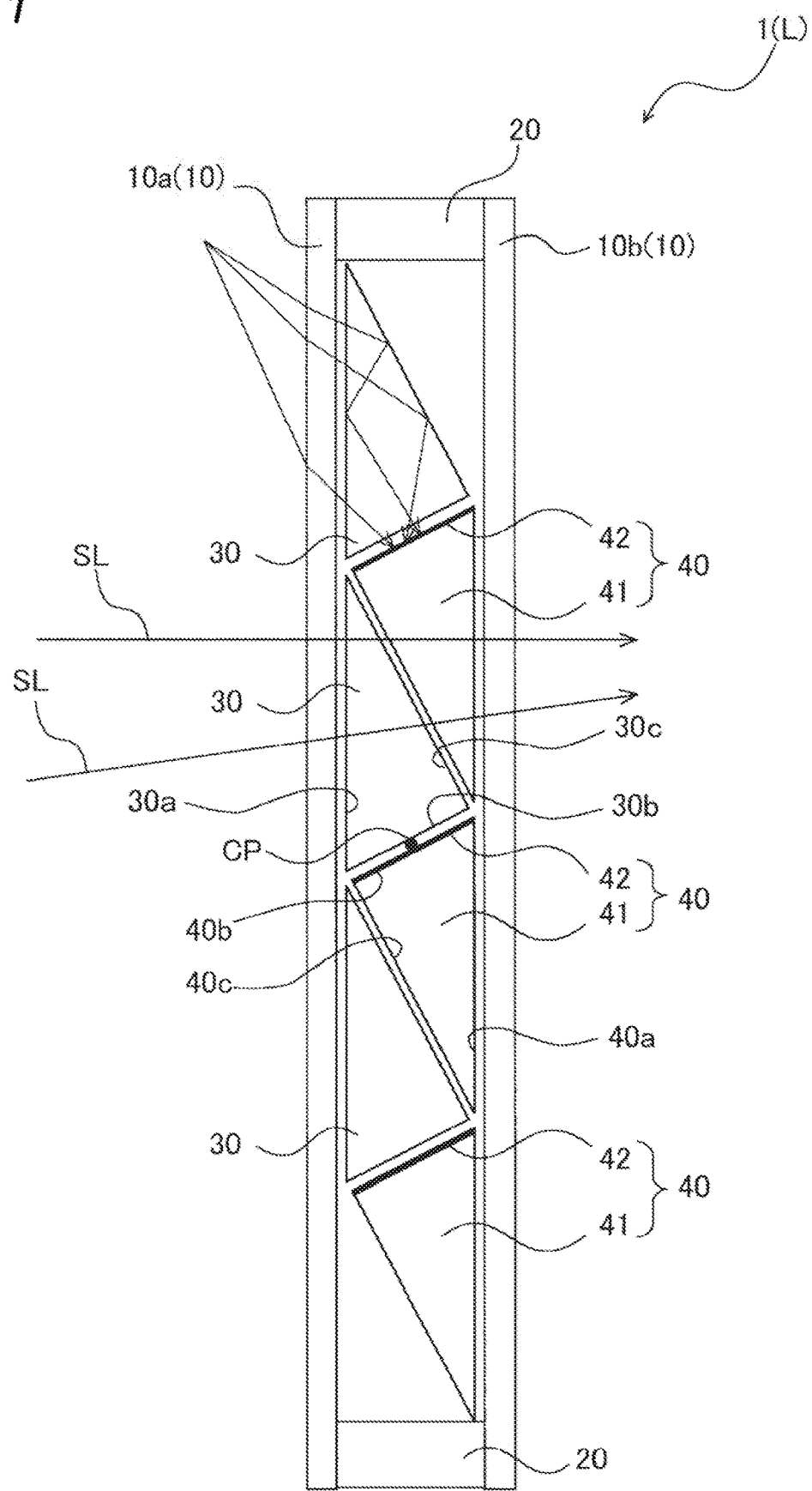
FIG. 1 is a sectional view illustrating a desiccant window according to a first embodiment of the present invention.

FIG. 1 is a sectional view illustrating a desiccant window according to a first embodiment of the present invention. In the following, a desiccant window that can be applied as a window (regardless of whether the window can be opened or closed) will be described as an example of a desiccant fitting, but the desiccant fitting is not limited to being applied to a window and may be an outer wall material or the like.

A desiccant window 1 according to the example illustrated in FIG. 1 schematically includes two plates 10, a peripheral end member 20, a plurality of triangular prisms 30, and a plurality of desiccant heat receiving units (desiccant elements, solar heat receiving units) 40. These are assembled together to form a generally flat plate structure.

The two plates 10 are plates having transparency and water vapor permeability that are arranged substantially in parallel with a space therebetween. These plates 10 are made of, for example, a porous glass, silicone, a moisture-permeable polyurethane resin used for a surgical film or the like, and a moisture-permeable watertight film such as Tyvek (registered trademark).

The peripheral end member 20 is interposed between the two plates 10 at a peripheral end portion of the two plates 10. By providing the peripheral end member 20 at the peripheral end portion of the two plates 10, an internal space closed by the two plates 10 and the peripheral end member 20 is formed.

The plurality of triangular prisms 30 and the plurality of desiccant heat receiving units 40 are arranged in the internal space formed by the two plates 10 and the peripheral end member 20. In addition, it is preferable that a plate or the like that is impermeable to water vapor is provided between the plurality of triangular prisms 30 and the plurality of desiccant heat receiving units 40.

The plurality of triangular prisms 30 are each formed of a prism (that is, a prism having a triangular shape) that is triangular in a sectional view. These triangular prisms 30 are arranged to face a first glass 10a such that a first side 30a is along the first glass (first plate) 10a. A second side 30b and a third side 30c of the triangular prism 30 extend at a predetermined angle with respect to the first side 30a. The second side 30b is a side positioned vertically below the third side 30c.

Figure 2:
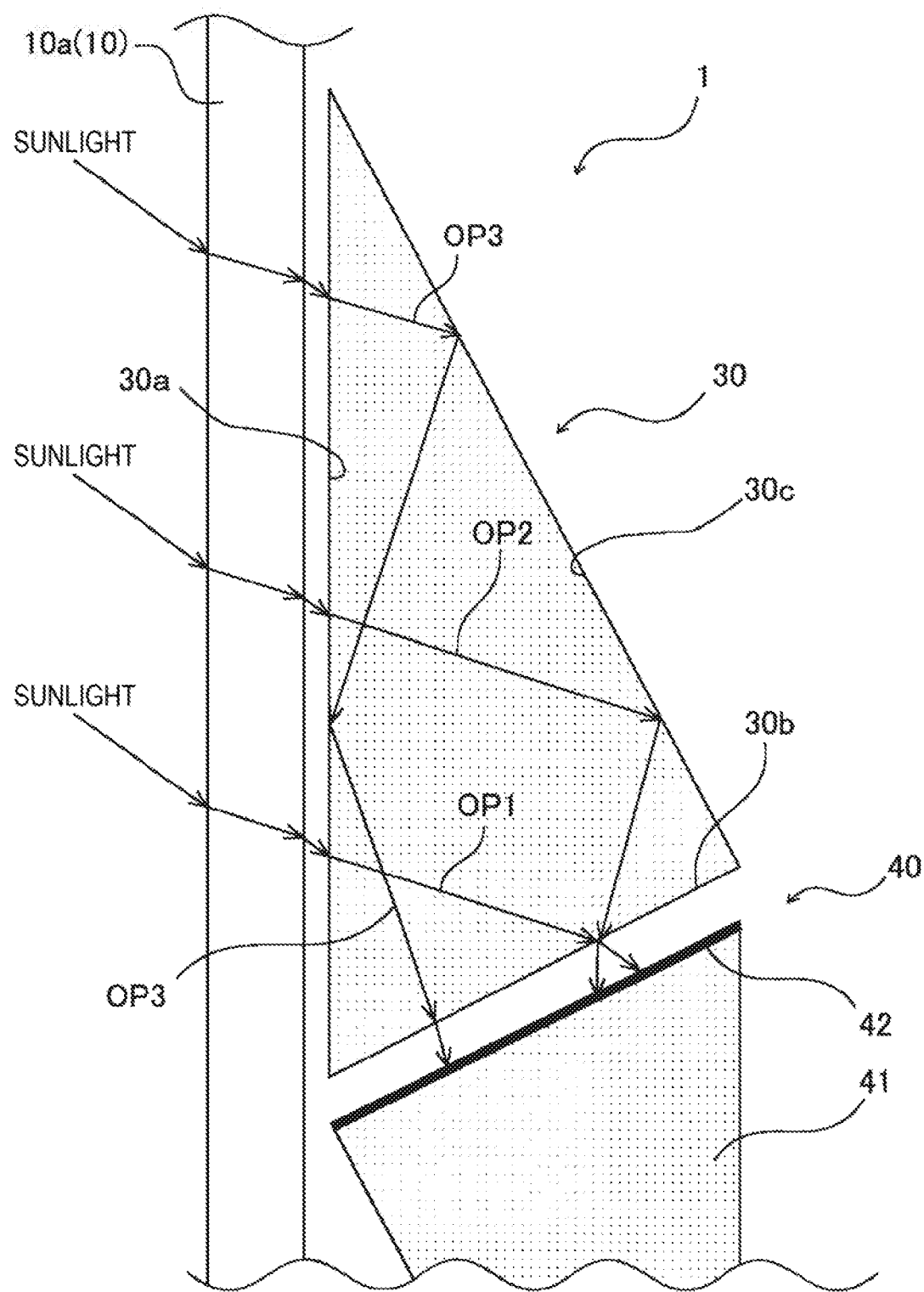
FIG. 2 is an enlarged view of a triangular prism illustrated in FIG. 1.

FIG. 2 is an enlarged view of the triangular prism 30 illustrated in FIG. 1. As illustrated in FIG. 2, the triangular prism 30 is configured of a transparent member such as a solid glass material or a resin material. In addition, the triangular prism 30 may be configured of a prism wall that forms the outer wall of the triangular prism 30 and an internal member made of a transparent liquid, a gel-like material, a solid, or the like enclosed inside the prism wall.

The description will be made with reference to FIG. 1 again. Each of the plurality of desiccant heat receiving units 40 includes a transparent prism (desiccant element) 41 and a selective absorbing unit (solar heat receiving unit) 42. The transparent prism 41 is configured of a porous member and functions as a desiccant element having hygroscopicity. Each of the transparent prisms 41 is a prism (that is, a prism having a triangular shape) that is triangular in a sectional view, and has the same shape and the same refractive index as those of the triangular prism 30.

Specifically, each of the transparent prisms 41 is disposed to face a second glass 10b such that a fourth side 40a is along the second glass (second plate) 10b. A fifth side 40b and a sixth side 40c of the prism 41 extend at a predetermined angle with respect to the fourth side 40a. The fifth side 40b is positioned vertically above the sixth side 40c. In the prism 41, the sixth side 40c opposes the third side 30c of the adjacent triangular prism 30 in the left-right direction, and the fifth side 40b opposes the second side 30b of the adjacent triangular prism 30 in the up-down direction.

The selective absorbing unit 42 is provided in contact with the prism 41, and is provided on the fifth side 40b of the prism 41. The selective absorbing unit 42 has a high absorptivity in a sunlight wavelength range (0.3 to 2.5 μm) and a low emissivity in an infrared wavelength range (3.0 to 20 μm). In addition, since the selective absorbing unit 42 is non-transparent, it can be said that the desiccant heat receiving unit 40 including the prism 41 and the selective absorbing unit 42 is partially non-transparent and the remaining part is transparent.

The desiccant heat receiving units 40 described above are arranged in point-symmetrical direction by rotating the triangular prism 30 by 180°, and are provided one by one for each triangular prism 30.

Here, in a case where only the triangular prism 30 is provided, the light is refracted by the triangular prism 30 and distortion occurs in the scenery viewed from the indoor side (that is, scattered light SL is largely distorted). However, by providing the desiccant heat receiving unit 40 in a pair with the triangular prism 30, the distortion of the scenery viewed from the indoor side is suppressed by the transparent prism 41 (image recovery effect is achieved).

The description will be made with reference to FIG. 2 again. In the triangular prism 30 according to the present embodiment, a refractive index and each internal angle of the triangle, which make it possible to realize the following three types of optical paths, are set. In a first optical path OP1 among the three types of optical paths OP1 to OP3, sunlight that passes through the first glass 10a and enters the triangular prism 30 from the first side 30a directly reaches the second side 30b and goes out of the triangular prism 30 from the second side 30b. In the second optical path OP2, the sunlight is totally reflected on the third side 30c, reaches the second side 30b, and goes out of the triangular prism 30 from the second side 30b. The third optical path OP3 is for sunlight that reaches the second side 30b after being totally reflected on the third side 30c and the first side 30a in order, and goes out of the triangular prism 30 from the second side 30b.

In order to realize the first to third optical paths OP1 to OP3, it is necessary that the incidence angle of the first optical path OP1 on the second side 30b is less than the critical angle. Further, it is necessary that the incidence angle of the second optical path OP2 on the third side 30c is equal to or greater than the critical angle and the incidence angle on the second side 30b after total reflection is less than the critical angle. Furthermore, it is necessary that the incidence angle of the third optical path OP3 on the third side 30c is equal to or greater than the critical angle, the incidence angle on the first side 30a after total reflection is equal to or greater than the critical angle, and further, the incidence angle on the second side 30b after total reflection is less than the critical angle. In a case where the triangular prism 30 satisfies the conditions of the second optical path OP2 and the third optical path OP3, the condition of total reflections of three or more times in the triangular prism 30 is always satisfied.

As described above, since the triangular prism 30 is configured to realize the three types of optical paths OP1 to OP3, the desiccant heat receiving unit 40 can efficiently receive the solar heat and efficiently heat itself. Since the desiccant heat receiving unit 40 is a hygroscopic member, the moisture is released when being heated.

In the first embodiment, it is assumed that the triangular prism 30 has a refractive index of 1.41, but the present invention is not limited thereto. Furthermore, not being limited to the transparent porous member, the desiccant heat receiving unit 40 (particularly, prism 41) may be configured to have an outer wall member which is at least one of a transparent porous member and a water vapor permeable member, and a hygroscopic liquid enclosed in a space defined by the outer wall member.

The description will be made with reference to FIG. 1. The triangular prism 30 and the desiccant heat receiving unit 40 as described above are substantially point-symmetric to each other with respect to a center position CP of the height and thickness of the desiccant window 1 in a sectional view. Therefore, as will be described later, in a case where the desiccant window 1 is rotated up and down (half turn in the up-down direction) while maintaining the left and right positions, the desiccant heat receiving unit 40 realizes three types of optical paths OP4 to OP6 (refer to FIGS. 4A to 4D).

Here, a fourth optical path OP4 among the three types of optical paths OP4 to OP6 is for sunlight that passes through the second glass 10b and enters the desiccant heat receiving unit 40 from the first side 40a directly reaches the fifth side 40b. The fifth optical path OP5 is for the sunlight that is totally reflected on the sixth side 40c and reaches the fifth side 40b. The sixth optical path OP6 is for sunlight that reaches the fifth side 40b after being totally reflected on the sixth side 40c and the fourth side 40a in order.

Figure 3:
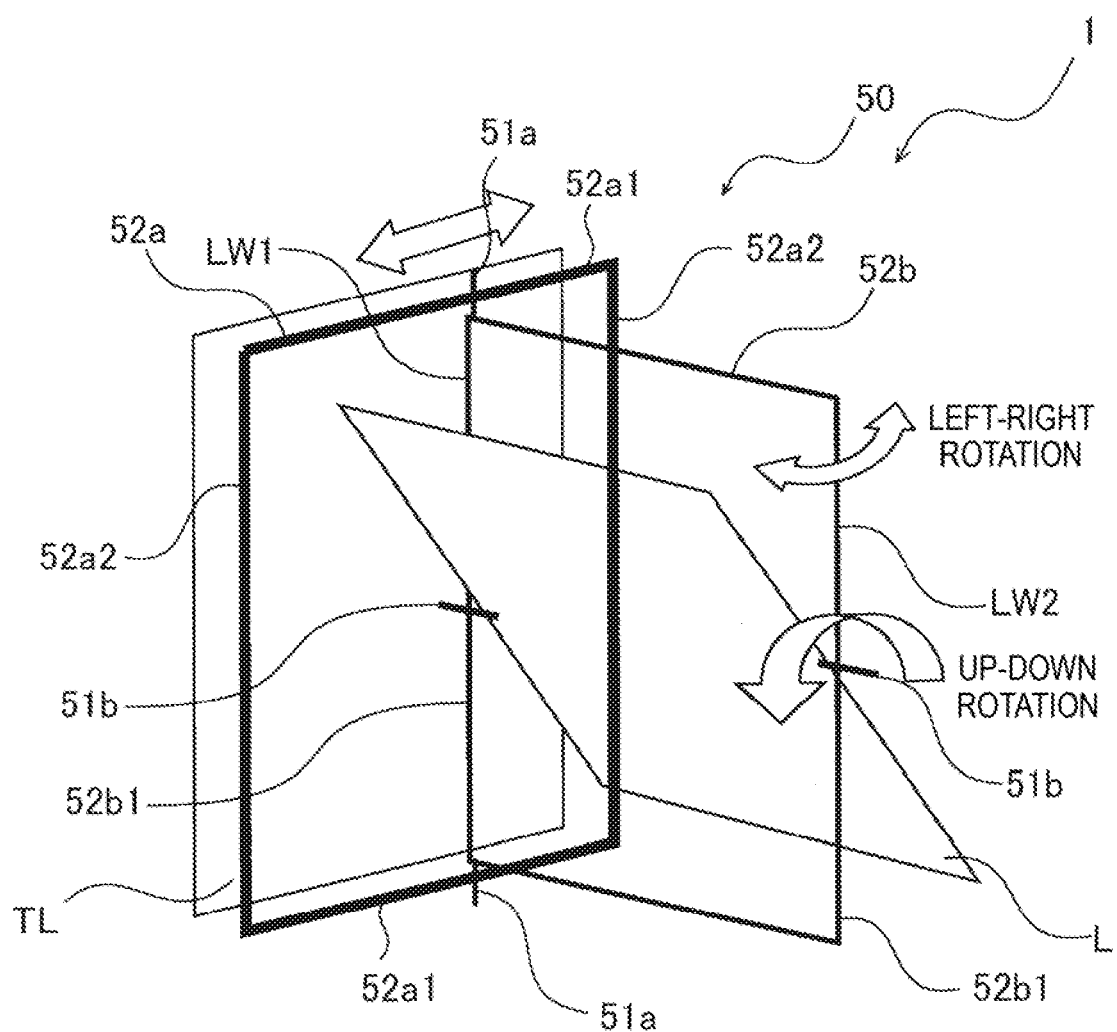
FIG. 3 is a perspective view illustrating the desiccant window according to the first embodiment and illustrates a rotating mechanism.

FIG. 3 is a perspective view illustrating the desiccant window 1 according to the first embodiment and illustrates a rotating mechanism. In the following description, the configuration excluding a rotating mechanism 50 (the two plates 10, the peripheral end member 20, the triangular prism 30, and the desiccant heat receiving unit 40) of the desiccant window 1 is referred to as a laminated body (structure) L.

As illustrated in FIG. 3, the desiccant window 1 according to the first embodiment further includes an outdoor louver TL on the outdoor side. Therefore, the desiccant window 1 illustrated in FIG. 3 is configured to be capable of rotating a half turn in the up-down direction and the left-right direction while the laminated body L does not come into contact with the outdoor louver TL.

In the example illustrated in FIG. 3, the rotating mechanism 50 includes a first pivot 51a, a second pivot 51b, a first window frame 52a, a second window frame 52b, and first and second locking means (not illustrated).

The first window frame 52a is a rectangular frame fixed to the building side. The second window frame 52b is provided with the first pivot 51a at an end portion LW1 on any one side of a left side and a right side, and the first pivot 51a is slidable with respect to upper and lower members 52a1 of the first window frame 52a. In addition, the second pivot 51b is attached to the middle portion of the laminated body L in the up-down direction, and is rotatably provided at the center portion of left and right members 52b1 of the rectangular second window frame 52b.

Therefore, a rotation operation can be performed as follows. First, it is assumed that the end portion LW1 of the second window frame 52b on the first pivot 51a side is positioned on one of left and right members 52a2 of the first window frame 52a. From this state, the first locking means is released, and an end portion LW2 of the second window frame 52b on the side where the first pivot 51a is not provided is pulled out to the indoor side. Next, the second locking means is released, and the laminated body L is rotated a half turn in the up-down direction around the second pivot 51b. In addition, the locking is performed by the second locking means. Next, the end portion LW1 of the second window frame 52b on the first pivot 51a side is slid to the other one of the left and right members 52a2 of the first window frame 52a. Thereafter, the second window frame 52b is fitted into the first window frame 52a such that the end portion LW2 of the second window frame 52b is on one side of the left and right members 52a2, and is locked by the first locking means.

As described above, in the desiccant window 1 having the outdoor louver TL on the outdoor side, the laminated body L is rotatable in both the up-down direction and the left-right direction.

Next, an operation of the desiccant window 1 according to the first embodiment will be described with reference to FIGS. 4A to 4D. FIGS. 4A to 4D are views for describing the operation of the desiccant window 1 according to the first embodiment, FIG. 4A illustrates a first state, FIG. 4B illustrates a second state, FIG. 4C illustrates a third state, and FIG. 4D illustrates a fourth state.

First, as illustrated in FIG. 4A, it is assumed that the triangular prism 30 is on the outdoor side, and the desiccant heat receiving unit 40 is oriented to the indoor side (first state). In this case, the triangular prism 30 guides the incident sunlight to the selective absorbing unit 42 of the desiccant heat receiving unit 40 by the three types of optical paths OP1 to OP3. Accordingly, the desiccant heat receiving unit 40 is efficiently heated by the three types of optical paths OP1 to OP3, and the moisture is released from the desiccant heat receiving unit 40. In other words, the indoor humidification effect can be achieved.

In addition, as illustrated in FIG. 4B, in a case where the above-described rotating mechanism 50 is used to make a half turn in the left-right direction (horizontal direction) while maintaining the up-down direction from the first state, the desiccant heat receiving unit 40 is oriented to the outdoor side (the second state is achieved). In this case, since the triangular prism 30 cannot realize the three types of optical paths OP1 to OP3, the desiccant heat receiving unit 40 is not heated and absorbs the moisture.

In particular, the desiccant window 1 according to the first embodiment can humidify the indoor dried in winter by being in the first state during the daytime in winter, for example, and can absorb the moisture during the nighttime by being in the second state during the nighttime in winter. In other words, by repeating the first state and the second state, the indoor humidification can be continuously performed.

In addition, as illustrated in FIG. 4C, in a case where the above-described rotating mechanism 50 is used to make a half turn in the up-down direction while maintaining the left-right direction from the first state, the desiccant heat receiving unit 40 is turned upside down and oriented to the outdoor side (the third state is achieved). In other words, the desiccant heat receiving unit 40 is positioned at the position of the triangular prism 30 illustrated in FIG. 1, and the triangular prism 30 is positioned at the position of the desiccant heat receiving unit 40 illustrated in FIG. 1. In this case, the desiccant heat receiving unit 40 realizes the three types of optical paths OP4 to OP6 and guides the sunlight to the selective absorbing unit 42. Accordingly, the desiccant heat receiving unit 40 is heated to release the moisture.

In addition, as illustrated in FIG. 4D, in a case where the above-described rotating mechanism 50 is used to make a half turn in the left-right direction (horizontal direction) while maintaining the up-down direction from the third state, the triangular prism 30 is oriented to the outdoor side (the fourth state is achieved). However, since the triangular prism 30 is turned upside down and cannot realize the three types of optical paths OP1 to OP3, the desiccant heat receiving unit 40 is not heated and absorbs the moisture.

In particular, the desiccant window 1 according to the first embodiment can absorb the moisture from the indoor in summer by being in the fourth state during the nighttime in summer, for example, and can regenerate the desiccant heat receiving unit 40 that has absorbed the moisture by being in the third state during the daytime in summer. In other words, by repeating the third state and the fourth state, it is possible to continuously dehumidify the indoor.

As described above, the desiccant window 1 according to the first embodiment can control the indoor humidity in accordance with the season by making the up-down rotation and the left-right rotation possible, and the humidity control effect can be continuously achieved.

In this manner, according to the desiccant window 1 according to the first embodiment, since the triangular prism 30 that forms the three types of optical paths OP1 to OP3 is provided, the desiccant heat receiving unit 40 can efficiently receive the solar heat. In addition, since the desiccant heat receiving unit 40 is heated by itself and releases the absorbed moisture, the indoor humidification due to the release of the moisture and the discarding (that is, regeneration) of the absorbed moisture can be performed more efficiently. Therefore, it is possible to provide the desiccant window 1 that can improve the indoor humidity control effect.

Since the second glass 10b and the prism 41 are transparent, the desiccant window 1 that can be used as a window can be provided.

Furthermore, rotation in both the up-down direction and the left-right direction is possible, the hygroscopic prism 41 and the selective absorbing unit 42 integrally configure a transparent desiccant heat receiving unit 40, and the desiccant heat receiving unit 40 has a point-symmetric structure with the triangular prism 30 in a sectional view. Therefore, in the first state where the triangular prism 30 is disposed above the desiccant heat receiving unit 40 and on the outdoor side using the rotating mechanism 50, the desiccant heat receiving unit 40 is efficiently heated by the triangular prism 30 and the moisture can be released to the indoor. Further, the desiccant heat receiving unit 40 can be used as a mere moisture absorbent in the second state where a half turn is made in the left-right direction from the first state, and the moisture can be stored. Furthermore, in the third state where a half turn is made in the up-down direction from the first state, the three types of optical paths OP4 to OP6 are realized by the desiccant heat receiving unit 40 having the same shape as that of the triangular prism 30 and the regeneration can be performed by heating the desiccant heat receiving unit 40. Moreover, the desiccant heat receiving unit 40 can be used as a mere moisture absorbent in the fourth state where rotation is performed respectively in the left-right direction and the up-down direction from the first state, and the indoor can be dehumidified. In addition, by switching these states in accordance with the season and time zone, it is possible to obtain the humidity control effect in accordance with the season.

In addition, since the desiccant heat receiving unit 40 is configured to have a transparent porous member or an outer wall member which is at least one of a transparent porous member and a water vapor permeable member, and a hygroscopic liquid enclosed in a space defined by the outer wall member, various configurations using solids or liquids can be used.

Next, a second embodiment of the present invention will be described. A desiccant window according to the second embodiment has the following configuration. Hereinafter, in the description of the second embodiment, the same or similar elements as those of the first embodiment will be given the same reference numerals.

Figure 5:
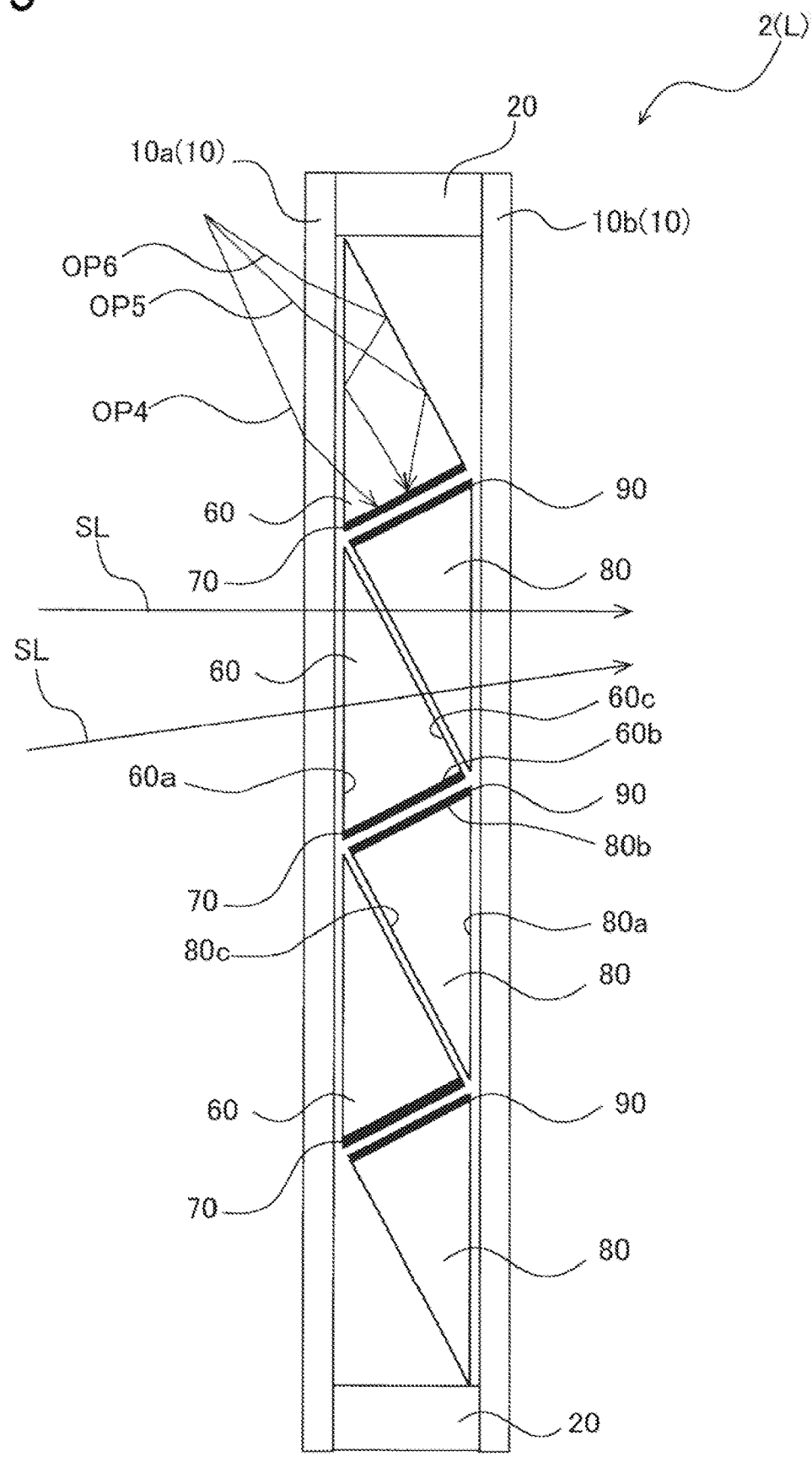
FIG. 5 is a sectional view illustrating a desiccant window according to a second embodiment.

FIG. 5 is a sectional view illustrating the desiccant window according to the second embodiment. As illustrated in FIG. 5, a desiccant window 2 according to the second embodiment schematically includes the two plates 10, the peripheral end member 20, a plurality of first desiccant prisms (desiccant elements, triangular prisms) 60, a plurality of first solar heat receiving units (solar heat receiving units) 70, a plurality of second desiccant prisms (second desiccant elements, second triangular prisms) 80, and a plurality of second solar heat receiving units 90.

Each of the plurality of first desiccant prisms 60 is configured of a transparent porous member, and the desiccant element and the triangular prism are integrally formed. In other words, the first desiccant prism 60 is obtained by adding the function of a desiccant element having hygroscopicity to the triangular prism 30 according to the first embodiment. Similar to the triangular prism 30 according to the first embodiment, each of the first desiccant prisms 60 is configured of a prism (that is, a triangular prism) having a triangular shape in a sectional view. The first desiccant prism 60 is disposed to face the first glass 10a such that a first side 60a is along the first glass 10a. A second side 60b and a third side 60c of the first desiccant prism 60 extend at a predetermined angle with respect to the first side 60a. The second side 60b is a side positioned vertically below the third side 60c.

The plurality of first solar heat receiving units 70 are configured of, for example, a selective absorbing film, and are provided in contact with the second side 60b of the first desiccant prism 60. The first solar heat receiving unit 70 receives solar heat from sunlight incident through the first desiccant prism 60, and has a large absorptivity in the sunlight wavelength range (0.3 to 2.5 μm) and a low emissivity in an infrared wavelength range (3.0 to 20 μm).

Here, in the second embodiment, the first desiccant prism 60 has a refractive index and each internal angle of the triangle set so as to realize the three types of optical paths OP4 to OP6. The fourth optical path OP4 among the three types of optical paths OP4 to OP6 is for sunlight that passes through the first glass 10a and enters the first desiccant prism 60 from the first side 60a directly reaches the second side 60b. The fifth optical path OP5 is for the sunlight that is totally reflected on the third side 60c and reaches the second side 60b. The sixth optical path OP6 is for sunlight that reaches the second side 60b after being totally reflected on the third side 60c and the first side 60a in order.

The plurality of second desiccant prisms 80 are configured of a transparent porous member similarly to the first desiccant prism 60, are disposed between the two plates 10, and have a hygroscopicity. Further, the second desiccant prism 80 is formed in the same shape and the same refraction as those of the first desiccant prism 60, and is disposed to be point-symmetric to the first desiccant prism 60 in a sectional view. In other words, the second desiccant prism 80 is disposed to face the second glass 10b such that a fourth side 80a is along the second glass 10b. A fifth side 80b and a sixth side 80c of the second desiccant prism 80 extend at a predetermined angle with respect to the fourth side 80a. The fifth side 80b is positioned vertically above the sixth side 80c.

In addition, in a case where the desiccant window 2 is rotated up and down (half turn in the up-down direction) while maintaining the left and right positions, the second desiccant prism 80 realizes the three types of optical paths OP4 to OP6. Furthermore, since the first desiccant prism 60 and the second desiccant prism 80 have the same shape and form a pair, an image recovery effect can be achieved. In other words, in a case where the user sees the scenery from the indoor side, the distortion of the scenery is suppressed (that is, the distortion of the scattered light SL is suppressed).

The plurality of second solar heat receiving units 90 are configured of a selective absorbing film similarly to the first solar heat receiving unit 70. The second solar heat receiving unit 90 is provided in contact with the fifth side 80b of the second desiccant prism 80.

In addition, similar to the first embodiment, not being limited to the transparent porous member, the first desiccant prism 60 and the second desiccant prism 80 according to the second embodiment may be configured to have an outer wall member which is at least one of a transparent porous member and a water vapor permeable member, and a hygroscopic liquid enclosed in a space defined by the outer wall member.

Figure 6:
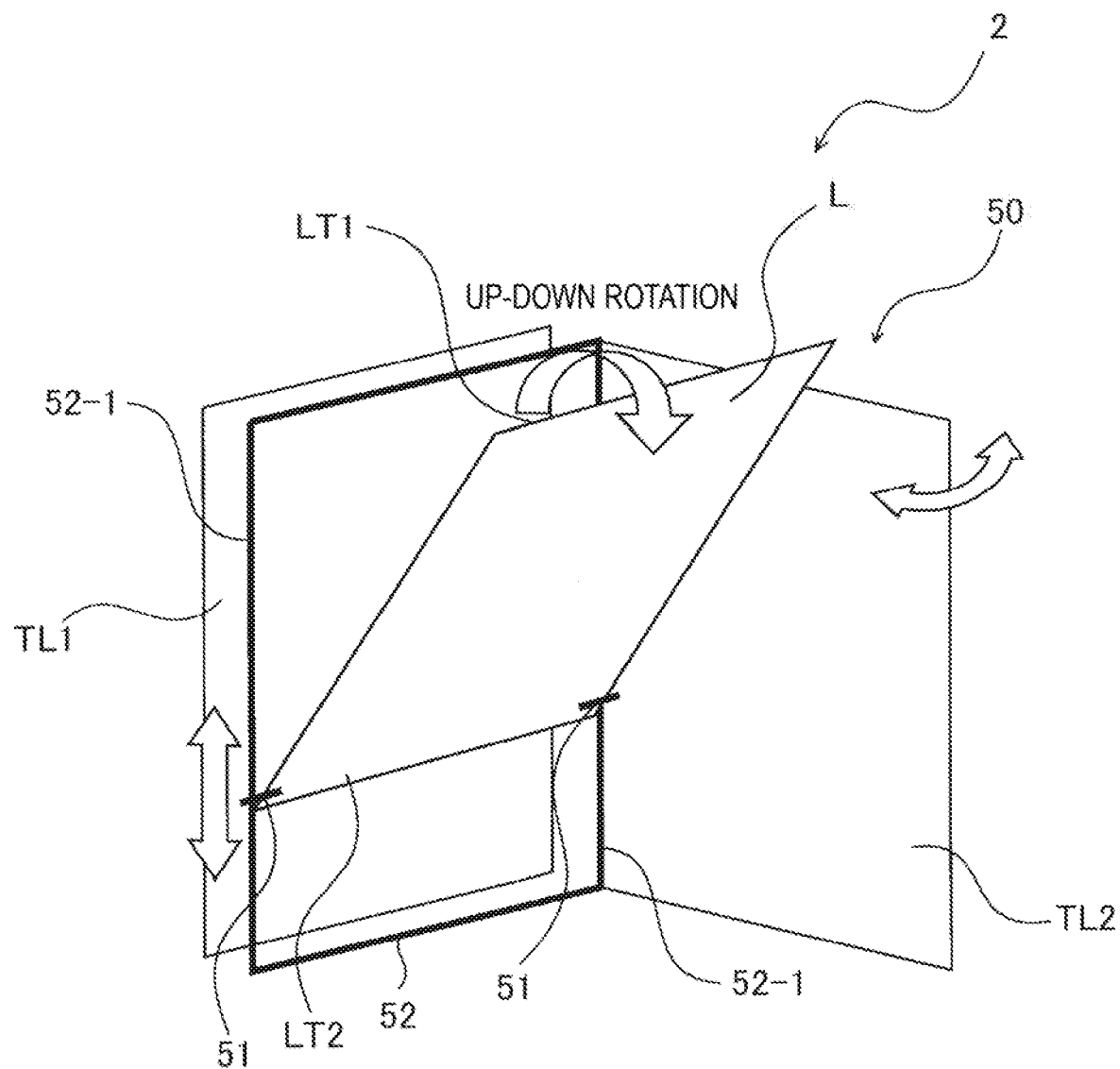
FIG. 6 is a perspective view illustrating the desiccant window according to the second embodiment and illustrates a rotating mechanism.

FIG. 6 is a perspective view illustrating the desiccant window 2 according to the second embodiment and illustrates the rotating mechanism. In the following description, the configuration excluding the rotating mechanism 50 (the two plates 10, the peripheral end member 20, the first desiccant prism 60, the first solar heat receiving unit 70, the second desiccant prism 80, and the second solar heat receiving unit) of the desiccant window 2 is referred to as the laminated body (structure) L.

As illustrated in FIG. 6, the desiccant window 2 includes a transparent louver TL1 which is also referred to as a jalousie window on the outdoor side of the laminated body L. In addition, the desiccant window 2 includes an indoor louver TL2 on the indoor side of the laminated body L. Furthermore, the desiccant window 2 according to the second embodiment includes the rotating mechanism 50. The rotating mechanism 50 includes a pivot 51, a window frame 52, and locking means (not illustrated), and allows the laminated body L to rotate a half turn without coming into contact with the louvers TL1 and TL2.

Specifically, the pivot 51 is a rotating shaft member provided at an end portions LT2 on any one side of an upper side and a lower side of the laminated body L. Such pivots 51 are provided on the left and right sides of the laminated body L, respectively. The window frame 52 has the laminated body L fitted therein, and the laminated body L fitted in the window frame 52 is in a locked state where the fitted state is maintained by the locking means (not illustrated). The pivot 51 is slidable with respect to left and right members 52-1 of the window frame 52. In addition, the indoor louver TL2 can be opened and closed in the indoor direction.

With such a configuration, a rotation operation can be performed as follows. First, it is assumed that the pivot 51 is positioned at the lower end of the window frame 52. From this state, the indoor louver TL2 is opened. Next, the locking means is released, and the end portion LT1 of the laminated body L on aside where the pivot 51 is not provided is pulled out to the indoor side. Next, the end portion LT2 of the laminated body L on the pivot 51 side is slid in the upward direction with respect to the window frame 52. Thereafter, when the end portion LT2 of the laminated body L reaches the upper end of the window frame 62, the laminated body L is fitted into the window frame 62 and locked by the locking means. Finally, the indoor louver TL2 is closed.

As described above, a half turn operation in the up-down direction is performed. When the half turn operation in the up-down direction is performed, the positions of the first desiccant prism 60 and the second desiccant prism 80 are switched.

Next, an operation of the desiccant window 2 according to the second embodiment will be described. First, as illustrated in FIG. 5, it is assumed that the first desiccant prism 60 is positioned on the outdoor side and the second desiccant prism 80 is positioned on the indoor side.

In this state, the sunlight reaches the first desiccant prism 60 through the first glass 10a. Since the first desiccant prism 60 realizes the three types of optical paths OP4 to OP6, the first solar heat receiving unit 70 efficiently receives sunlight and receives solar heat. Accordingly, the first desiccant prism 60 releases the moisture to the outside air through the first glass 10a.

Meanwhile, in the second desiccant prism 80, the three types of optical paths OP4 to OP6 are not realized, and the moisture on the indoor side is taken in. In other words, the moisture on the indoor side is absorbed by the second desiccant prism 80 through the second glass 10b having water vapor permeability. Accordingly, a dehumidification effect is achieved on the indoor side.

Further, it is assumed that the laminated body L is rotated a half turn in the up-down direction while maintaining the left and right positions using the rotating mechanism 50 illustrated in FIG. 6. In this case, the second desiccant prism 80 is oriented to the outdoor side, and the first desiccant prism 60 is oriented to the indoor side.

In this state, the sunlight reaches the second desiccant prism 80 through the second glass 10b. Since the first desiccant prism 60 and the second desiccant prism 80 are arranged to be point-symmetric, the three types of optical paths OP4 to OP6 are also realized in the second desiccant prism 80. Accordingly, the second solar heat receiving unit 90 efficiently receives sunlight and receives solar heat. In addition, the second desiccant prism 80 is heated by the second solar heat receiving unit 90, and releases the moisture. In other words, from the second desiccant prism 80 that has taken in the moisture on the indoor side, the moisture is released and the second desiccant prism 80 is regenerated.

Meanwhile, the first desiccant prism 60 on the indoor side is in a regenerated state and takes in the moisture on the indoor side. Accordingly, the dehumidification effect is achieved on the indoor side.

As described above, the desiccant window 2 according to the second embodiment can dehumidify the indoor by rotating up and down, and the dehumidification effect can be continuously achieved.

In this manner, according to the desiccant window 2 according to the second embodiment, similar to the first embodiment, the indoor humidity control effect can be improved, and the desiccant window 2 that can be used as a window can be provided.

Furthermore, according to the second embodiment, the first desiccant prism 60 and the second desiccant prism 80 are provided, and are disposed to be point-symmetric. For the reason, in a case where the first desiccant prism 60 is positioned on the outdoor side of the second desiccant prism 80, the first solar heat receiving unit 70 can efficiently heat the first desiccant prism 60 and the regeneration can be performed. Meanwhile, the second desiccant prism 80 can absorb the indoor moisture. In a case where the moisture absorption is sufficiently performed by the second desiccant prism 80, the second desiccant prism 80 is disposed to be point-symmetric when being placed on the outdoor side by being rotated half turn in the up-down direction, and thus the second desiccant prism 80 can be efficiently regenerated by the second solar heat receiving unit 90. Furthermore, the first desiccant prism 60 moves to the indoor side in a state of being regenerated by the half turn in the up-down direction, and can absorb the moisture on the indoor side. Therefore, a continuous dehumidification effect can be achieved on the indoor side.

In addition, since the first desiccant prism 60 and the second desiccant prism 80 are configured to have a transparent porous member or an outer wall member which is at least one of a transparent porous member and a water vapor permeable member, and a hygroscopic liquid enclosed in a space defined by the outer wall member, various configurations using solids or liquids can be used.

Next, a third embodiment of the present invention will be described. A desiccant window according to the third embodiment has the following configuration. Hereinafter, in the description of the third embodiment, the same or similar elements as those of the second embodiment will be given the same reference numerals.

Figure 7:
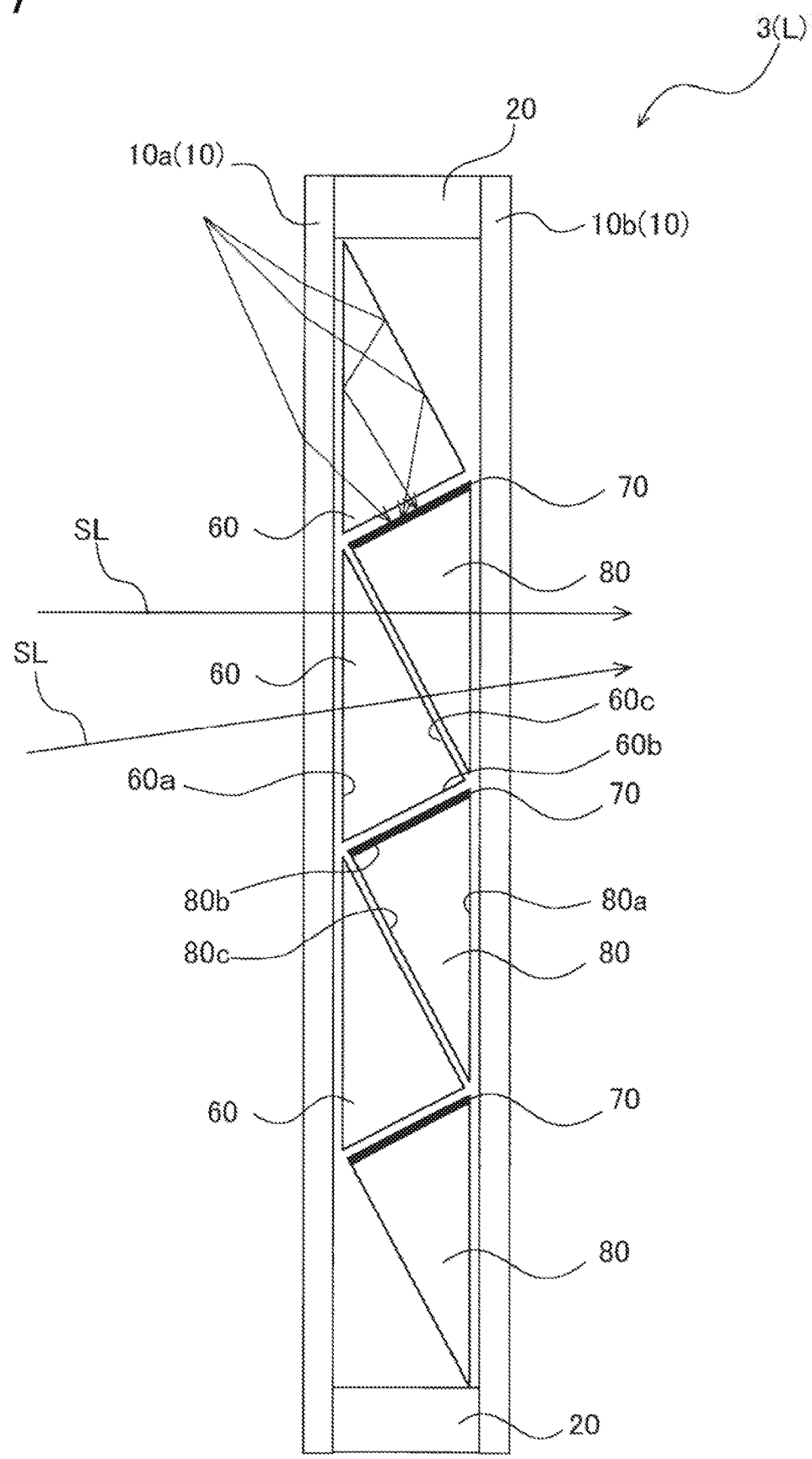
FIG. 7 is a sectional view illustrating a desiccant window according to a third embodiment.

FIG. 7 is a sectional view illustrating the desiccant window according to the third embodiment. As illustrated in FIG. 7, similar to the second embodiment, a desiccant window 3 according to the third embodiment schematically includes the two plates 10, the peripheral end member 20, the plurality of first desiccant prisms (desiccant elements, triangular prisms) 60, and the plurality of second desiccant prisms (second desiccant elements, second triangular prisms) 80. Furthermore, the desiccant window 3 includes the plurality of first solar heat receiving units 70 and does not include the second solar heat receiving unit 90.

Figure 8:
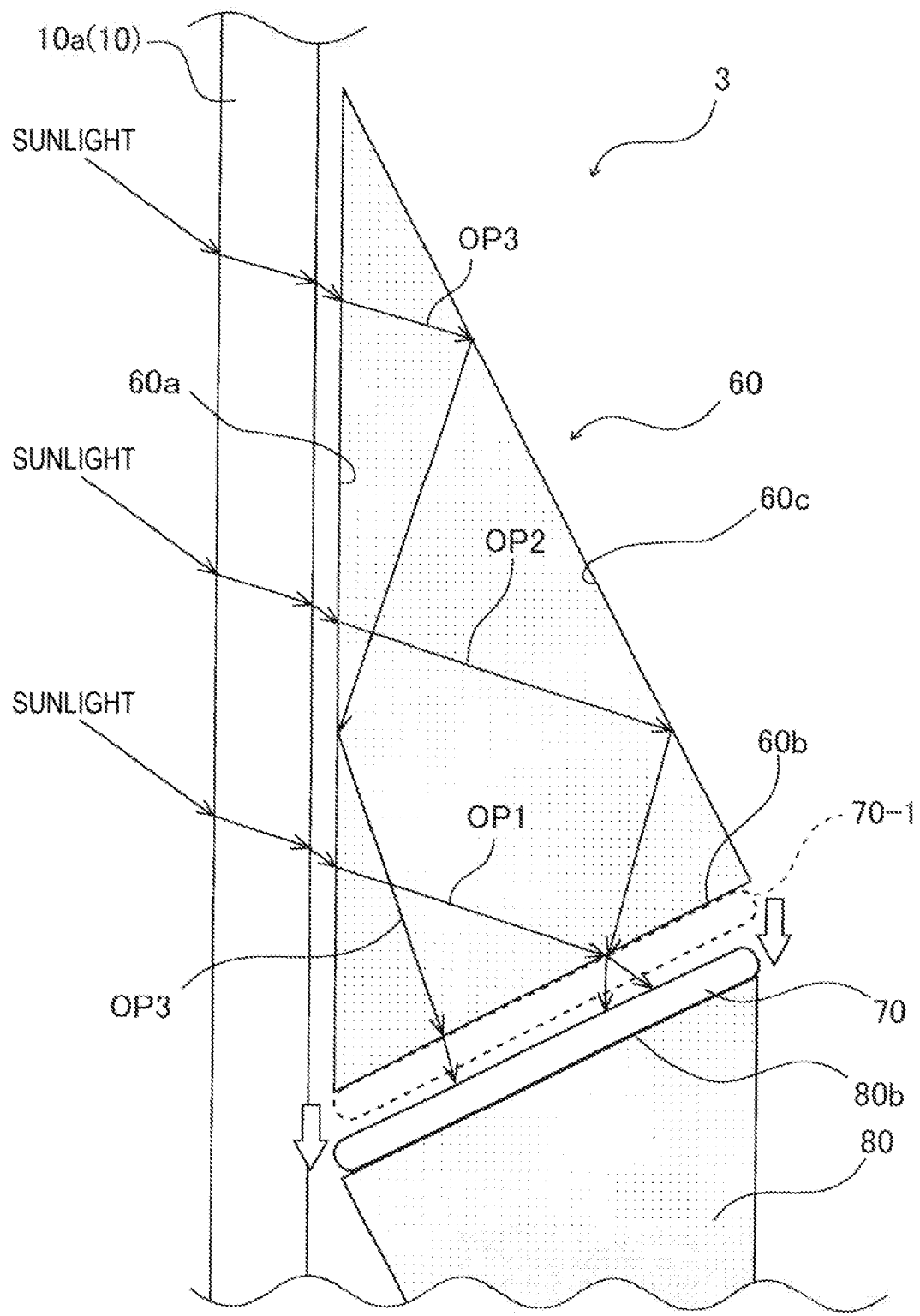
FIG. 8 is an enlarged view of a solar heat receiving unit illustrated in FIG. 7.

FIG. 8 is an enlarged view of the first solar heat receiving unit 70 illustrated in FIG. 7. As illustrated in FIG. 8, the first solar heat receiving unit 70 according to the third embodiment can move between the second side 60b of the first desiccant prism 60 and the fifth side 80b of the second desiccant prism 80. In other words, the first solar heat receiving unit 70 can move from the position (a position that is in contact with the fifth side 80b of the second desiccant prism 80) illustrated in FIG. 8 to the position (a position that is in contact with the second side 60b of the first desiccant prism 60) indicated by a reference numeral 70-1.

When the first desiccant prism 60 is oriented to the outdoor side due to the up-down rotation by the rotating mechanism 50, the first solar heat receiving unit 70 comes into contact with the fifth side 80b of the second desiccant prism 80 by using empty weight or motor power. In addition, when the first desiccant prism 60 is oriented to the outdoor side due to the up-down rotation by the rotating mechanism 50, the first solar heat receiving unit 70 comes into contact with the fifth side 80b of the second desiccant prism 80 by using empty weight or motor power.

Next, an operation of the desiccant window 3 according to the third embodiment will be described. First, as illustrated in FIG. 7, it is assumed that the first desiccant prism 60 is positioned on the outdoor side and the second desiccant prism 80 is positioned on the indoor side.

In this state, the sunlight reaches the first desiccant prism 60 through the first glass 10a. Since the first desiccant prism 60 realizes the three types of optical paths OP1 to OP3, the first solar heat receiving unit 70 efficiently receives sunlight and receives solar heat. Here, the first solar heat receiving unit 70 heats the second desiccant prism 80 because the first solar heat receiving unit 70 is in contact with the fifth side 80b of the second desiccant prism 80. Accordingly, the second desiccant prism 80 releases the moisture to the outside air through the second glass 10b. Accordingly, the humidification effect is achieved on the indoor side.

Meanwhile, since the first desiccant prism 60 is oriented to the outdoor side, the first desiccant prism 60 absorbs the moisture from outdoor.

Furthermore, it is assumed that the laminated body L is rotated a half turn in the up-down direction while maintaining the left and right positions using the rotating mechanism 50 illustrated in FIG. 6. In this case, the second desiccant prism 80 is oriented to the outdoor side, and the first desiccant prism 60 is oriented to the indoor side.

In this state, the sunlight reaches the second desiccant prism 80 through the second glass 10b. Since the first desiccant prism 60 and the second desiccant prism 80 have a point-symmetric structure, the three types of optical paths OP1 to OP3 are also realized in the second desiccant prism 80. Accordingly, the first solar heat receiving unit 70 efficiently receives sunlight and receives solar heat.

In addition, the first solar heat receiving unit 70 heats the first desiccant prism 60 because the first solar heat receiving unit 70 is in contact with the second side 60b of the first desiccant prism 60 by being rotated a half turn in the up-down direction. Here, since the first desiccant prism 60 absorbs the moisture when being oriented to the outdoor side, the moisture is released to the outside air through the first glass 10a. Accordingly, the humidification effect is achieved on the indoor side.

Meanwhile, since the second desiccant prism 80 is oriented to the outdoor side, the second desiccant prism 80 absorbs the moisture from outdoor.

In particular, the desiccant window 3 according to the third embodiment can heat the desiccant prisms 60 and 80 on the indoor side by repeating the up-down rotation to humidify the indoor side, and the humidification effect can be continuously achieved.

In this manner, according to the desiccant window 3 according to the third embodiment, similar to the second embodiment, the indoor humidity control effect can be improved, and the desiccant window 3 that can be used as a window can be provided. Furthermore, for the first desiccant prism 60 and the second desiccant prism 80, various configurations using the solids or liquids can be used.

Furthermore, according to the third embodiment, the first solar heat receiving unit 70 comes into contact with the fifth side 80b of the second desiccant prism 80 when the first desiccant prism 60 is oriented to the outdoor side by the rotation by the rotating mechanism 50, and comes into contact with the second side 60b of the first desiccant prism 60 when the second desiccant prism 80 is oriented to the outdoor side by the rotation by the rotating mechanism 50. For the reason, it is possible to continue to heat one of the first desiccant prism 60 and the second desiccant prism 80, which is positioned on the indoor side, and the humidification effect can be achieved in the indoor. Meanwhile, since the one of the first desiccant prism 60 and the second desiccant prism 80, which is positioned on the outdoor side, is not heated, the moisture in the atmosphere can be stored. Therefore, a continuous dehumidification effect can be achieved on the indoor side.

In addition, in the third embodiment, the first solar heat receiving unit 70 is always in contact with the desiccant prisms 60 and 80 on the indoor side. However, no matter which one is on the indoor side or on the outdoor side, by using the power of a motor (driving means) or the like, the first solar heat receiving unit 70 may come into contact with any one of the second side 60b of the first desiccant prism 60 and the fifth side 80b of the second desiccant prism 80. This is because, for example, when the first desiccant prism 60 is positioned on the outdoor side, the first solar heat receiving unit 70 can be moved upward to come into contact with the second side 60b of the first desiccant prism 60, or when the second desiccant prism 80 is positioned on the outdoor side, the first solar heat receiving unit 70 can be moved upward to come into contact with the fifth side 80b of the second desiccant prism 80.

In addition, in a case of being configured as described above, when the desiccant prisms 60 and 80 on the outdoor side are heated using sunlight, the desiccant prisms 60 and 80 on the indoor side perform indoor dehumidification, and the desiccant prisms 60 and 80 on the outdoor side can be heated and regenerated. Further, when the desiccant prisms 60 and 80 on the indoor side are heated using sunlight, the desiccant prisms 60 and 80 on the outdoor side perform moisture absorption from the outside air, the desiccant prisms 60 and 80 on the indoor side can be heated, and the indoor can be humidified. Accordingly, the desiccant window 3 in which humidification and dehumidification can be selected can be provided.

Next, a fourth embodiment of the present invention will be described. A desiccant window according to the fourth embodiment has the following configuration. Hereinafter, in the description of the fourth embodiment, the same or similar elements as those of the second embodiment will be given the same reference numerals.

Figure 9:
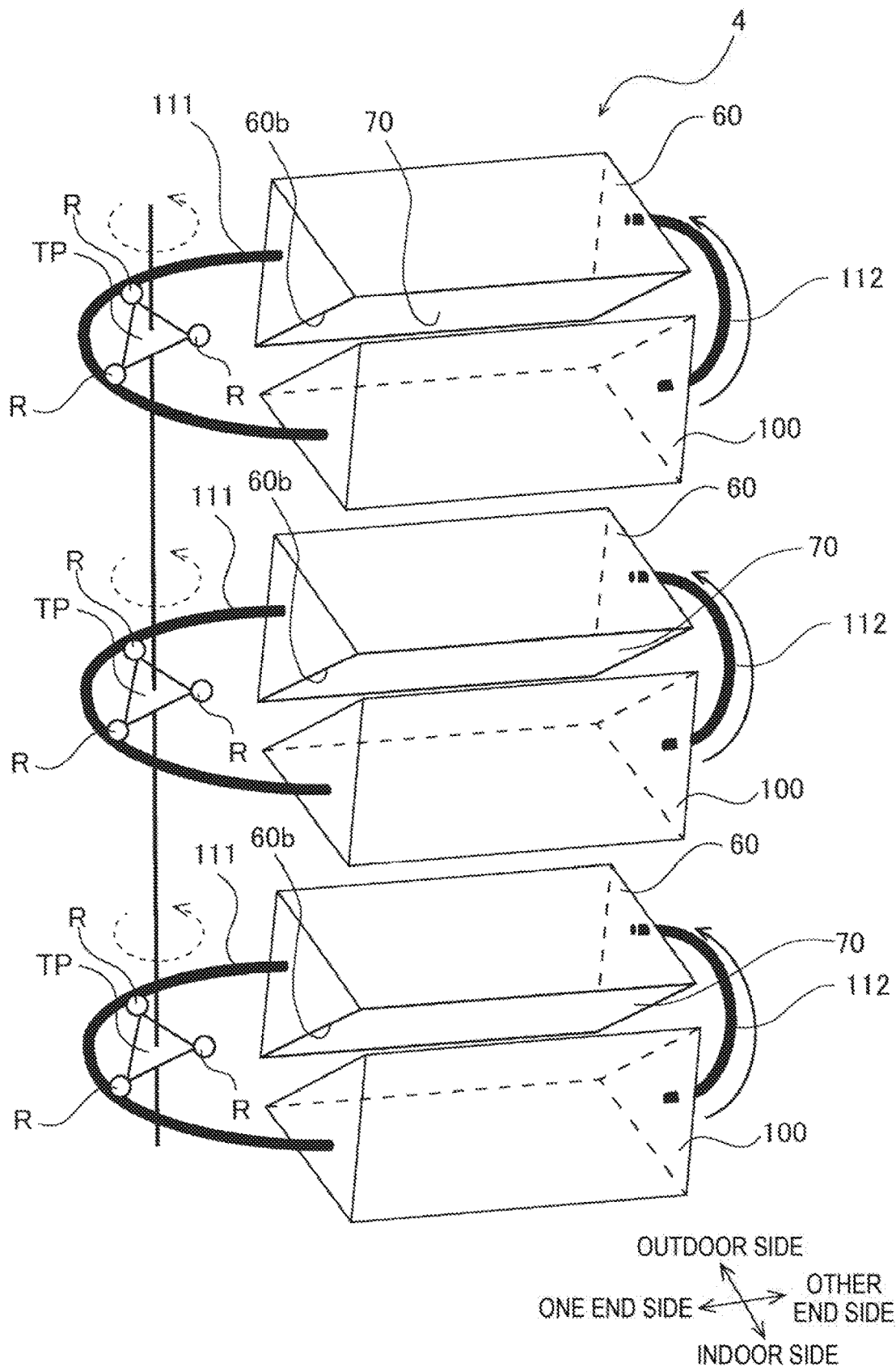
FIG. 9 is a perspective view illustrating a desiccant window according to a fourth embodiment.

FIG. 9 is a perspective view illustrating a desiccant window according to the fourth embodiment. In FIG. 9, the illustration of apart of the configuration will be omitted.

As illustrated in FIG. 9, similar to the second embodiment, a desiccant window 4 according to the fourth embodiment schematically includes the two plates 10 (not illustrated), the peripheral end member 20 (not illustrated), and the plurality of first desiccant prisms (desiccant elements, triangular prisms, and desiccant prisms) 60. Furthermore, the desiccant window 4 includes the plurality of first solar heat receiving units (solar heat receiving unit) 70 and does not include the second solar heat receiving unit 90. The first solar heat receiving unit 70 is provided in contact with the second side 60b of the first desiccant prism 60.

Furthermore, the desiccant window 4 according to the fourth embodiment includes a desiccant element (second desiccant element) 100 instead of the plurality of second desiccant prisms 80 according to the second embodiment.

Figure 10:
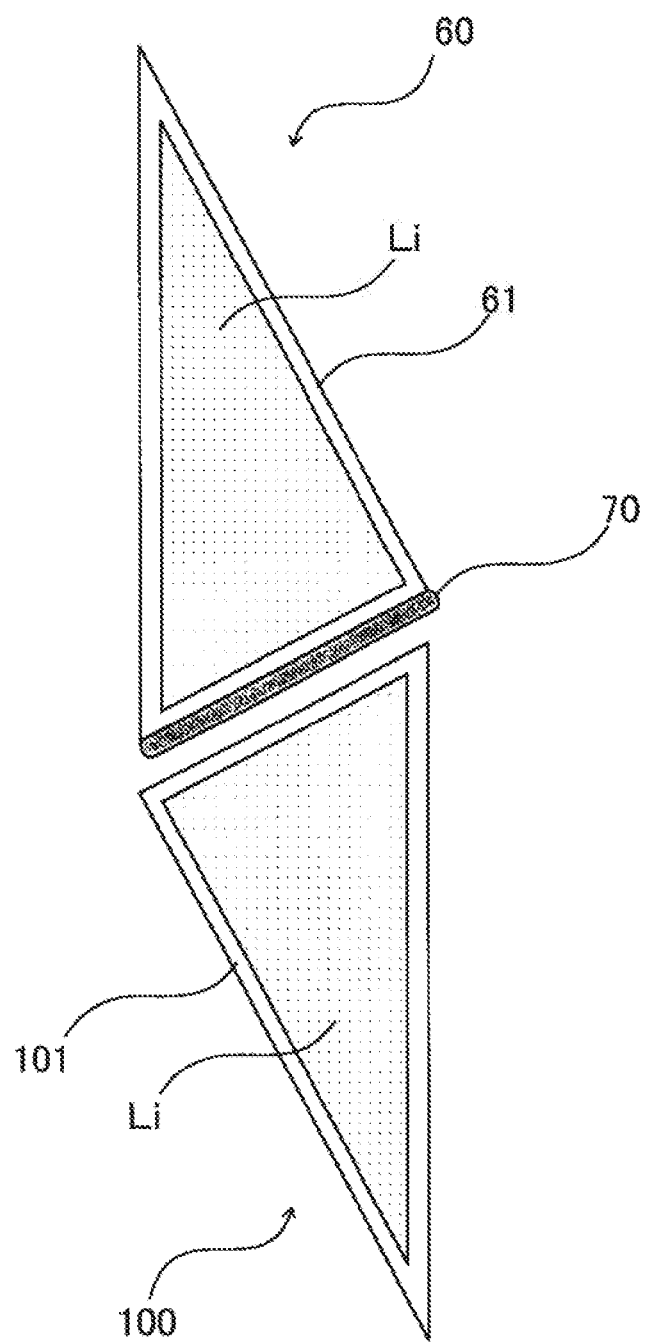
FIG. 10 is an enlarged sectional view illustrating a first desiccant prism, a solar heat receiving unit, and a desiccant element illustrated in FIG. 9.

FIG. 10 is an enlarged sectional view illustrating the first desiccant prism 60, the first solar heat receiving unit 70, and the desiccant element (second desiccant element) 100 which are illustrated in FIG. 9. As illustrated in FIG. 10, in the fourth embodiment, the desiccant element 100 is configured of a transparent and porous outer wall member (transparent tube) 101 on the indoor side of the first desiccant prism 60, and a hygroscopic liquid Li enclosed therein. Similarly, the first desiccant prism 60 is also configured of a transparent and porous outer wall member (transparent tube) 61 and the hygroscopic liquid Li enclosed therein. In the fourth embodiment, the outer wall member 101 is a triangular tube in order to achieve the image recovery effect, but the present invention is not limited thereto.

The description will be made with reference to FIG. 9 again. Furthermore, the desiccant window 4 according to the fourth embodiment includes a first connection pipe 111, a second connection pipe 112, and a tube pump TP.

The first connection pipe 111 is a pipe for connecting one end side of the first desiccant prism 60 and one end side of the desiccant element 100 to each other, and the second connection pipe 112 is a pipe for connecting the other end side of the first desiccant prism 60 and the other end side of the desiccant element 100 to each other. Of these, at least the first connection pipe 111 is configured of a tube body made of an elastic material such as rubber.

The tube pump TP is a power for sending the hygroscopic liquid Li inside the first desiccant prism 60 to the desiccant element 100. The tube pump TP includes a plurality of rollers R that can be pressed against the first connection pipe 111 made of an elastic tube body, the plurality of rollers R move (rotate) while being pressed against the first connection pipe 111, and accordingly, the hygroscopic liquid Li in the first connection pipe 111 is sent to the desiccant element 100.

With such a configuration, the hygroscopic liquid Li inside the first desiccant prism 60 is sent to the desiccant element 100 by the rotation of the tube pump TP, and the hygroscopic liquid Li of the desiccant element 100 returns to the first desiccant prism 60 through the second connection pipe 112 so as to be pushed out.

Next, an operation of the desiccant window 4 according to the fourth embodiment will be described.

First, the sunlight reaches the first desiccant prism 60 through the first glass 10a. Since the first desiccant prism 60 realizes the three types of optical paths OP4 to OP6, the first solar heat receiving unit 70 efficiently receives sunlight and receives solar heat, and the first desiccant prism 60 is heated. Accordingly, the hygroscopic liquid Li inside the first desiccant prism 60 releases the moisture to the outside air through the outer wall member 61 and the first glass 10a.

Meanwhile, the desiccant element 100 takes in the moisture on the indoor side. In other words, the moisture on the indoor side is absorbed to the desiccant element 100 through the second glass 10b and the outer wall member 101. Accordingly, the dehumidification effect is achieved on the indoor side.

Here, in the desiccant window 4 according to the fourth embodiment, the tube pump TP is operating. Therefore, the desiccant element 100 is supplied with the hygroscopic liquid Li regenerated by the first desiccant prism 60. In addition, the hygroscopic liquid Li inside the desiccant element 100 that has absorbed the moisture is returned to the first desiccant prism 60 through the second connection pipe 112.

As described above, the desiccant window 4 according to the fourth embodiment can continuously dehumidify the indoor by circulating the hygroscopic liquid Li between the first desiccant prism 60 and the desiccant element 100.

In this manner, according to the desiccant window 4 according to the fourth embodiment, similar to the second embodiment, the indoor humidity control effect can be improved, and the desiccant window 4 that can be used as a window can be provided.

Furthermore, according to the fourth embodiment, since the hygroscopic liquid Li of the first desiccant prism 60 and the hygroscopic liquid Li of the desiccant element 100 are connected to each other by piping so as to be capable of circulating, the hygroscopic liquid Li is heated and regenerated in the first desiccant prism 60, and the hygroscopic liquid Li absorbs the moisture from the indoor in the desiccant element 100. In addition, since the hygroscopic liquid Li is circulated, a continuous dehumidification effect can be achieved on the indoor side.

Next, a fifth embodiment of the present invention will be described. A desiccant window according to the fifth embodiment has the following configuration. Hereinafter, in the description of the fifth embodiment, the same or similar elements as those of the fourth embodiment will be given the same reference numerals.

Figure 11:
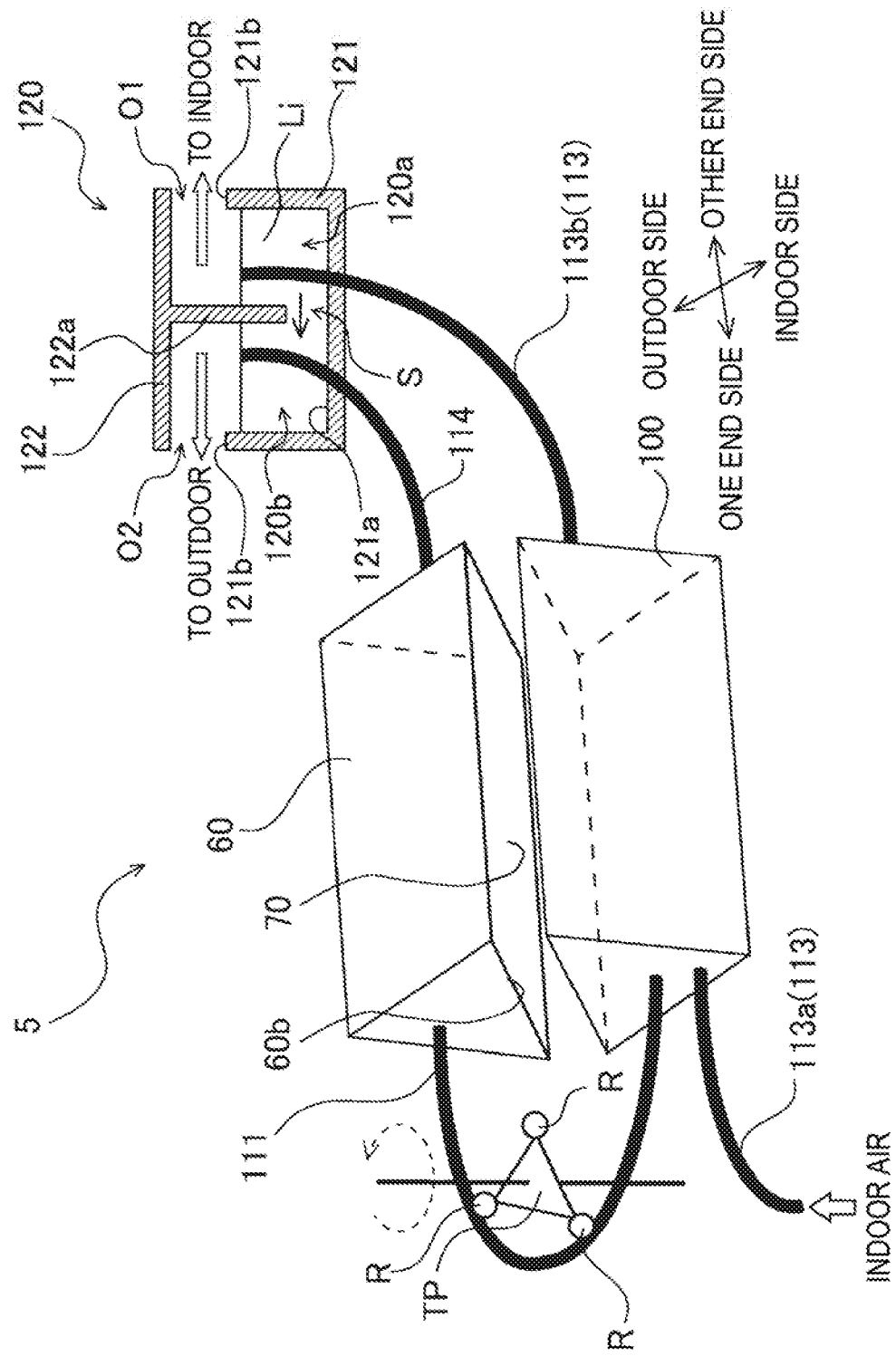
FIG. 11 is a perspective view illustrating a desiccant window according to a fifth embodiment.

FIG. 11 is a perspective view illustrating a desiccant window according to the fifth embodiment. In FIG. 11, the illustration of apart of the configuration will be omitted. As illustrated in FIG. 11, a desiccant window 5 does not include the second connection pipe 112 according to the fourth embodiment, but includes a first pipe 113, a second pipe 114, and an intermediate fixture 120. In the fifth embodiment, the outer wall members 61 and 101 of the first desiccant prism 60 and the desiccant element 100 are not configured of a porous tube that is permeable to water vapor, but are configured of a tube that is not permeable to water vapor. Furthermore, the two plates 10 are also configured of an impermeable material that does not have water vapor permeability.

The first pipe 113 includes an intake pipe 113a for sending the indoor air to the inside of the desiccant element 100, and an exhaust pipe 113b for discharging the air in the desiccant element 100. The intake pipe 113a is connected to, for example, a blower (not illustrated) and sends the indoor air to one end side of the desiccant element 100. One end of the exhaust pipe 113b is connected to the other end side of the desiccant element 100, the other end is connected to a first chamber 120a of the intermediate fixture 120, and the exhaust pipe 113b has not only a function of discharging the air in the desiccant element 100, but also a function of discharging the hygroscopic liquid Li in the desiccant element 100 to the intermediate fixture 120.

The second pipe 114 is a pipe for discharging the water vapor in the first desiccant prism 60. One end of the second pipe 114 is connected to the other end side of the first desiccant prism 60, the other end is connected to a second chamber 120b of the intermediate fixture 120, and the second pipe 114 has not only a function of discharging the water vapor, but also a function of introducing the hygroscopic liquid Li from the intermediate fixture 120.

The intermediate fixture 120 includes a lower member 121 having a U-shaped section and an upper member 122 having a T-shaped section, and is disposed such that a T-shaped vertical member 122a is inserted in a state of not being in contact with a bottom surface 121a of the lower member 121.

Since the vertical member 122a does not come into contact with the bottom surface 121a, a gap S is formed. In the intermediate fixture 120, one side (connection side of the exhaust pipe 113b) separated by the vertical member 122a becomes a first chamber 120a, and the other side (connection side of the second pipe 114) becomes the second chamber 120b.

In the intermediate fixture 120, both U-shaped end portions 121b are in a state of not being in contact with the upper member 122, and thus a gap is formed. Among the gaps, the gap on the first chamber 120a side is a first opening portion O1 connected to the indoor, and the gap on the second chamber 120b side is a second opening portion O2 connected to the outdoor.

Next, an operation of the desiccant window 5 according to the fifth embodiment will be described.

First, the sunlight reaches the first desiccant prism 60 through the first glass 10a. Since the first desiccant prism 60 realizes the three types of optical paths OP4 to OP6, the first solar heat receiving unit 70 efficiently receives sunlight and receives solar heat, and the first desiccant prism 60 is heated. Accordingly, the hygroscopic liquid Li inside the first desiccant prism 60 releases the water vapor (moisture). This water vapor reaches the second chamber 120b of the intermediate fixture 120 through the second pipe 114, and is discharged to the outside from the second opening portion O2 on the second chamber 120b side.

Meanwhile, the hygroscopic liquid Li regenerated by heating reaches the inside of the desiccant element 100 through the first connection pipe 111 by the tube pump TP. The indoor air is sent into the desiccant element 100 through the intake pipe 113a, and the hygroscopic liquid Li in the desiccant element 100 absorbs the moisture from the sent indoor air. The air that has absorbed the moisture reaches the first chamber 120a of the intermediate fixture 120 through the exhaust pipe 113b, and is discharged to the indoor from the first opening portion O1 on the first chamber 120a side.

Further, the hygroscopic liquid Li in the desiccant element 100 reaches the first chamber 120a of the intermediate fixture 120 through the exhaust pipe 113b in a state where the moisture is absorbed. The hygroscopic liquid Li in the first chamber 120a reaches the second chamber 120b through the gap S between the vertical member 122a and the bottom surface 121a, and is returned to the first desiccant prism 60 through the second pipe 114.

As described above, the desiccant window 4 according to the fifth embodiment can continuously dehumidify the indoor by circulating the hygroscopic liquid Li between the first desiccant prism 60 and the desiccant element. Moreover, since the water vapor is discharged to the outdoor through the second opening portion O2 of the intermediate fixture 120 and the dehumidified air is supplied to the indoor through the first opening portion O1, it is not necessary that the outer wall members 61 and 101 of the first desiccant prism 60 and the desiccant element 100, and the two plates 10 have water vapor permeability.

In this manner, according to the desiccant window 5 according to the fifth embodiment, similar to the fourth embodiment, the indoor humidity control effect can be improved, and the desiccant window 5 that can be used as a window can be provided. In addition, the hygroscopic liquid Li is circulated, and a continuous dehumidification effect can be achieved on the indoor side.

Furthermore, according to the fifth embodiment, since the first pipe 113 for sending the indoor air to the inside of the desiccant element 100 and discharging the air into the desiccant element 100, and the second pipe 114 for discharging the water vapor in the first desiccant prism 60 are provided, it is not necessary to use a member having water vapor permeability, and the dehumidification and the discarding of moisture can be performed through the first pipe 113 and the second pipe 114.

Next, a sixth embodiment of the present invention will be described. A desiccant window according to the sixth embodiment has the following configuration. Hereinafter, in the description of the sixth embodiment, the same or similar elements as those of the fifth embodiment will be given the same reference numerals.

Figure 12:
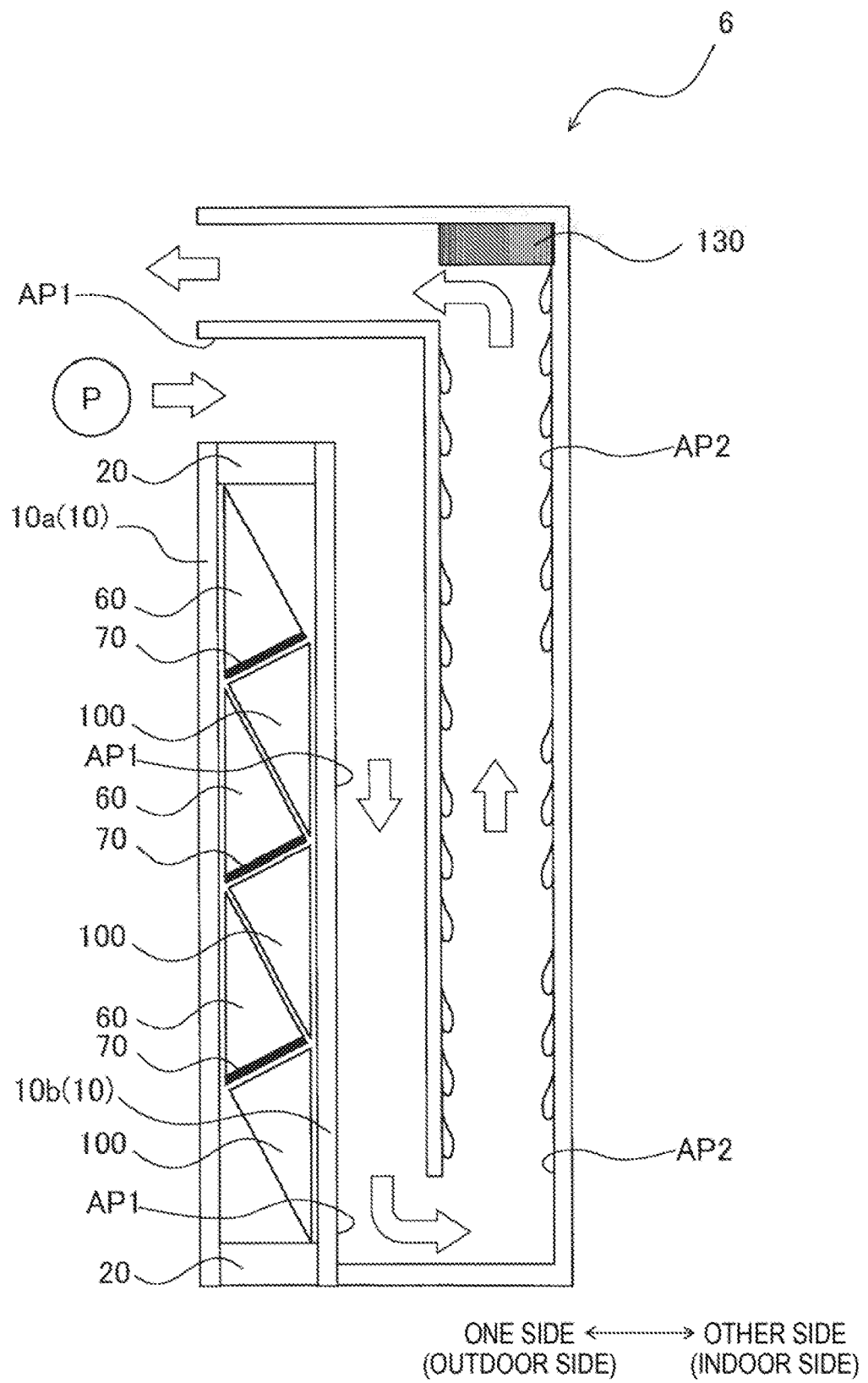
FIG. 12 is a sectional view illustrating a desiccant window according to a sixth embodiment.

FIG. 12 is a sectional view illustrating a desiccant window according to the sixth embodiment. In FIG. 12, the illustration of apart of the configuration will be omitted.

As illustrated in FIG. 12, a desiccant window 6 according to the sixth embodiment includes a first airflow path AP1, a second airflow path AP2, a pump (pumping means) P, and a dripping unit (dripping means) 130, in addition to the configuration illustrated in the fifth embodiment (the two plates 10, the first desiccant prism 60, the desiccant element 100, the first solar heat receiving unit 70, each of the pipes 111, 113, and 114, the intermediate fixture 120, and the tube pump TP).

The first air flow path AP1 is a flow path having one end connected to the outside and extending at least in the up-down direction while being adjacent to the second glass 10b side. In addition, the first air flow path AP1 may meander or the like as long as the air flow path extends in the up-down direction while being adjacent to the second glass 10b side. The pump P sends the outside air to the first air flow path AP1.

The second air flow path AP2 is a flow path having one end connected to the other end of the first air flow path AP1 and the other end connected to the outside. The second air flow path AP2 is a flow path extending at least in the up-down direction in which one side is adjacent to the first air flow path AP1 and the other side is adjacent to the indoor. The second air flow path AP2 may meander or the like as long as the air flow path extends in the up-down direction while one side is adjacent to the first air flow path AP1 and the other side is adjacent to the indoor. The dripping unit 130 is for dripping the liquid (water) on the inner surface on both one side and the other side of the second air flow path AP2.

Next, an operation of the desiccant window 6 according to the sixth embodiment will be described.

First, the pump P sends the outside air (air) to the first air flow path AP1. The hygroscopic liquid Li is circulating between the first desiccant prism 60 and the desiccant element 100, the air that flows through the first air flow path AP1 is dehumidified, and the moisture is discarded to the outside air.

The dehumidified air reaches the second air flow path AP2. Since the liquid is dripped in the second air flow path AP2, the liquid is vaporized by the dehumidified air, and the indoor side (the other side) is cooled by the heat of vaporization. In addition, since the liquid on the first air flow path AP1 side is also vaporized and cooled, the air that flows from the first air flow path AP1 to the second air flow path AP2 is also cooled, and the indoor is also cooled by the cooling air flowing through the second air flow path AP2.

In this manner, according to the desiccant window 6 according to the sixth embodiment, similar to the fifth embodiment, since the first air flow path AP1 on the second glass 10b side is efficiently dehumidified, the vaporization in the second air flow path AP2 can be performed more efficiently, and the temperature control effect (cooling effect) can be improved. Further, when the members and the liquid that configure each of the flow paths AP1 and AP2 have transparency, the desiccant window 6 that can be used as a window can be provided. In addition, it is not necessary to use a member having water vapor permeability, and the dehumidification and the discarding of the moisture can be performed through the first pipe 113 and the second pipe 114.

Furthermore, according to the sixth embodiment, since the first air flow path AP1 having one end connected to the outside and extending at least in the up-down direction while being adjacent to the second glass 10b side is provided, the moisture of the air from the outside is absorbed and dried from the second glass 10b side. In addition, since the second air flow path AP2 adjacent to the first air flow path AP1 is provided, and the liquid is dripped on one side (a side adjacent to the first air flow path AP1) and the other side (indoor side) of the second air flow path AP2, the liquid can be evaporated by the dried air and the indoor side can be cooled. In addition, since the liquid on the first air flow path AP1 side is also evaporated and cooled, the air that flows from the first air flow path AP1 to the second air flow path AP2 is also cooled, and the indoor can also be cooled as the cooling air flows through the second air flow path AP2. Therefore, the indoor cooling effect can be achieved.

Above, the present invention has been described based on the embodiments, but the present invention is not limited to the above-described embodiments, and may be changed within a range that does not depart from the spirit of the present invention, or the technologies described in each of the embodiments may be appropriately combined with each other within a possible range. Furthermore, the publicly-known or well-known technologies may be combined with each other within a possible range.

For example, in the above-described embodiments, the rotating mechanism 50 illustrated in FIGS. 3, 6, 7, and 9 is illustrated, but the rotating mechanism 50 is not limited to the illustrated one, and various configurations can be adopted.

Figure 13:
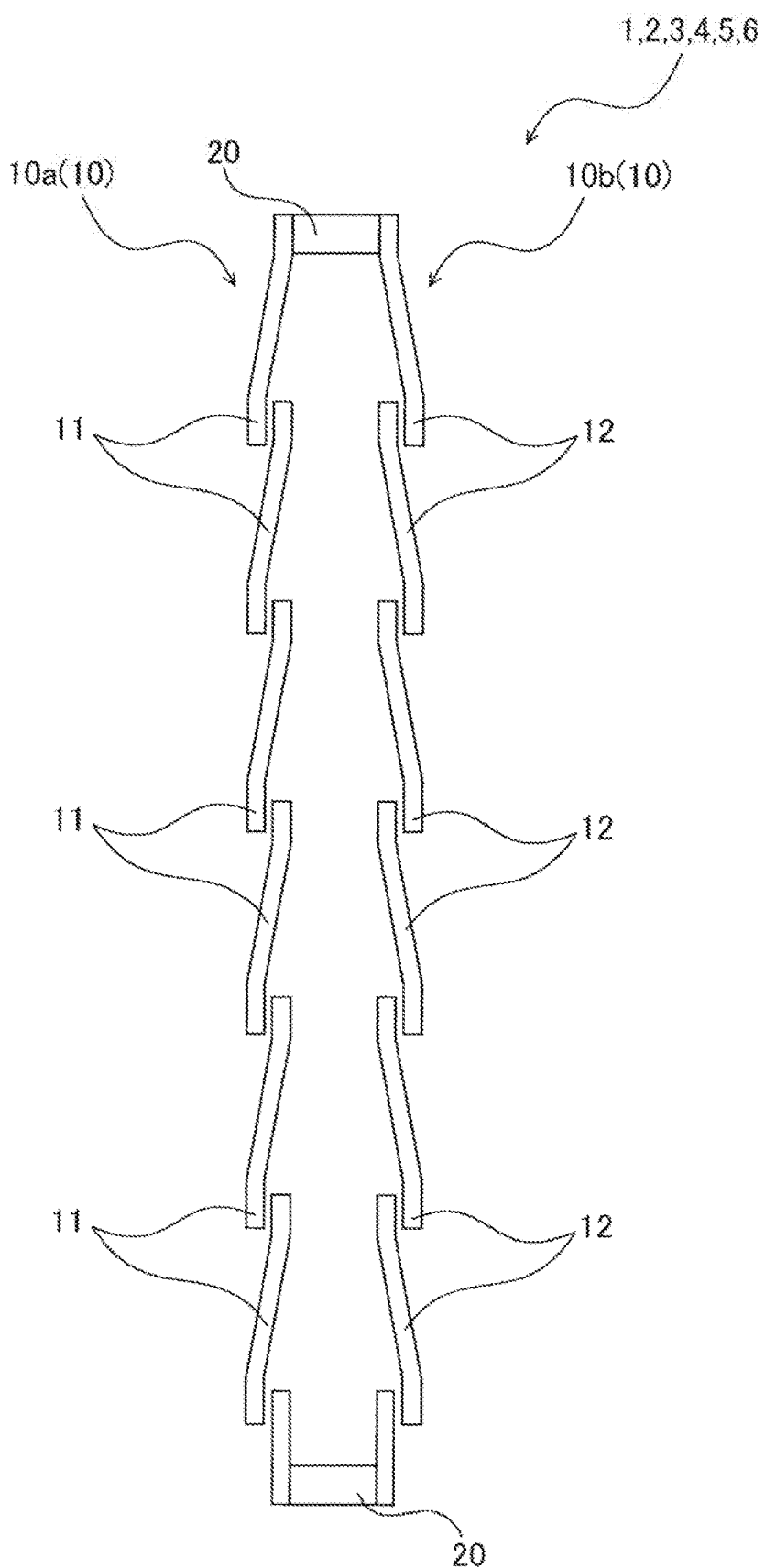
FIG. 13 is a sectional view illustrating a desiccant window according to a modification example.

Furthermore, although a flat plate is used as the two plates 10 in the above-described embodiments, the present invention is not limited thereto. FIG. 13 is a sectional view illustrating the desiccant windows 1 to 6 according to a modification example. In FIG. 13, the illustration of the configuration on the space side sandwiched between the two plates 10 and the peripheral end member 20 will be omitted.

As illustrated in FIG. 13, the two plates 10 may be configured of a plurality of plates 11 and 12 having a louver configuration. More specifically, in a case where the plurality of plates 11 and 12 are used in the upright surface state, each of the plates extends slightly inclining with respect to the vertical direction, and the upper end side and the lower end side are in a laminated state with a gap between adjacent plates 11 and 12, respectively. Even with such a configuration, when the plurality of plates 11 and 12 have transparency, sunlight can be taken in and guided to the first solar heat receiving unit 70 and the like. Further, since there are gaps between the plurality of plates 11 and 12, it is not necessary to use a member having water vapor permeability. In addition, not being limited to the case where both of the two plates 10 are configured of the plurality of plates 11 and 12, only one of the two plates may be configured of the plurality of plates 11 and 12.

In addition, the two plates 10 are not limited to one plate, may be formed by bonding end surfaces of two or more plates to each other, and a louver configuration having a gap in a planar view (front view) may be employed.

In the fifth embodiment, the outer wall members 61 and 101 and the two plates 10 are configured of a material which is impermeable to water vapor, but not being limited thereto, may be configured of a member having water vapor permeability. In addition, in the first to third embodiments as well, each part may be configured using the hygroscopic liquid Li, and each part may be configured of a material which is impermeable to water vapor using the intermediate fixture 120 or the like.

Figure 14:
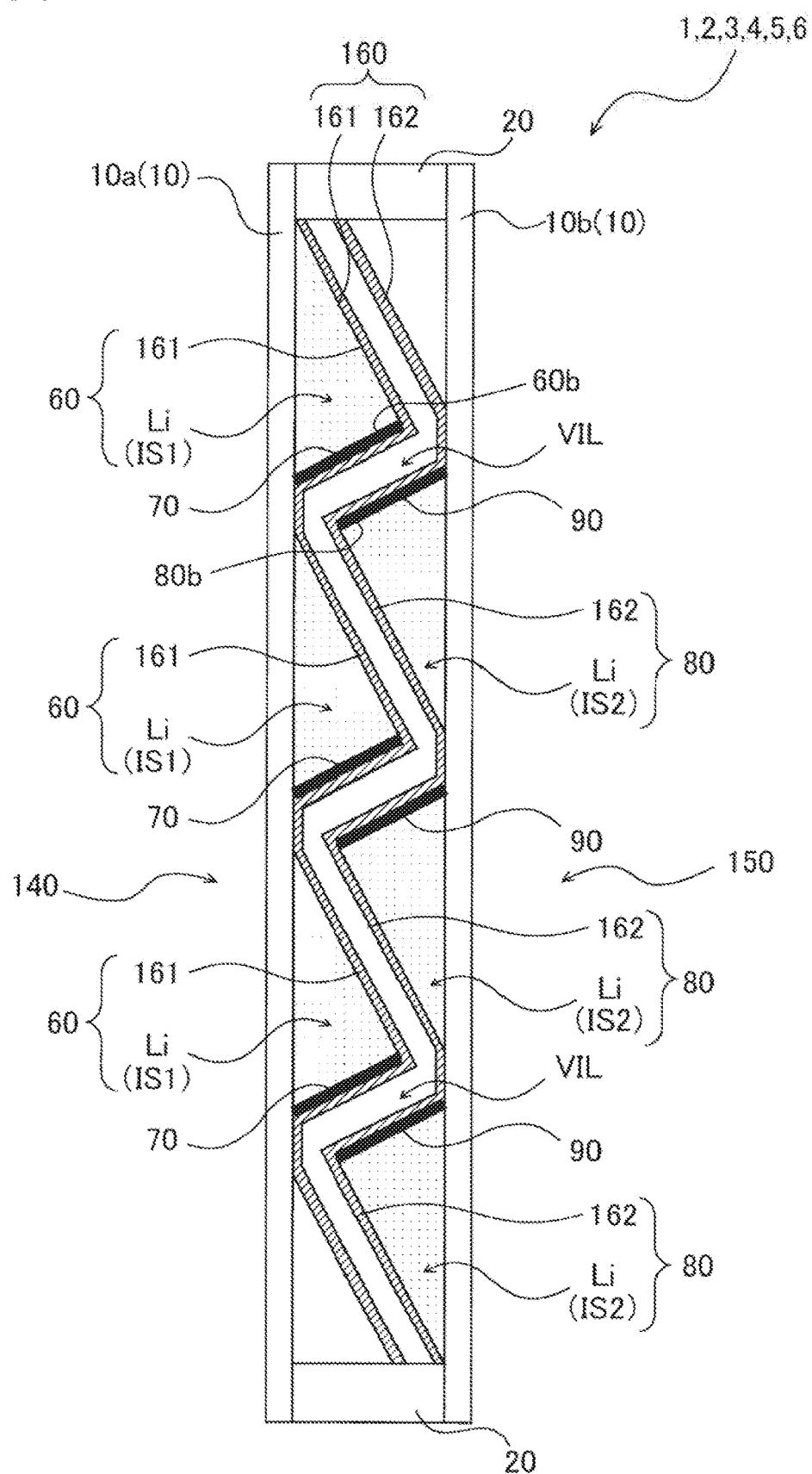
FIG. 14 is a sectional view illustrating a desiccant window according to a second modification example.

Furthermore, the desiccant prisms 60 and 80 may be configured as follows. FIG. 14 is a sectional view illustrating the desiccant windows 1 to 6 according to a second modification example. The desiccant windows 1 to 6 according to the example illustrated in FIG. 14 schematically includes the two plates 10, the peripheral end member 20, a first unit 140, a second unit 150, and two isolation walls (outer wall members) 160.

The first unit 140 and the second unit 150 are arranged in an internal space formed by the two plates 10 and the peripheral end member 20. The first unit 140 and the second unit 150 are air-tightly separated by the two isolation walls 160. These two isolation walls 160 are configured of a transparent plate, and are separated from each other such that the first plate 10a side of the two plates 10 is the first unit 140, and the second plate 10b side of the two plates 10 is the second unit 150. In addition, the space between the two isolation walls 160 is a vacuum heat insulating layer (isolation layer) VIL.

More specifically, both of the two isolation walls 160 have a zigzag shape in a sectional view, and a plurality of first internal spaces IS1 are formed by a first wall 161 out of the two isolation walls 160 and the first plate 10a. Each of the plurality of first internal spaces IS1 has a triangular shape in a sectional view. The first internal space IS1 is filled with the hygroscopic liquid Li. As a result, the first desiccant prism 60 is formed by the hygroscopic liquid Li and the first wall 161. In other words, the first desiccant prism 60 may maintain the triangular shape using the first plate 10a. The first solar heat receiving unit 70 is provided at a position that becomes the second side 60b of the first desiccant prism 60. The first solar heat receiving unit 70 may be in contact with the first wall 161 on the first internal space IS1 side, or may be in contact with the first wall 161 on the outside of the first internal space IS1. Further, the first desiccant prism 60 may be configured by enclosing a hygroscopic solid or a gel-like material in the first internal space IS1.

Similarly, a plurality of second internal spaces IS2 are formed by the second wall 162 out of the two isolation walls 160 and the second plate 10b. Each of the plurality of second internal spaces IS2 has a triangular shape in a sectional view. The second internal space IS2 is filled with the hygroscopic liquid Li. As a result, the second desiccant prism 80 is formed by the hygroscopic liquid Li and the second wall 162. In other words, the second desiccant prism 80 may maintain the triangular shape using the second plate 10b. The second solar heat receiving unit 90 is provided at a position that becomes the fifth side 80b of the second desiccant prism 80. The second solar heat receiving unit 90 may be in contact with the second wall 162 on the second internal space IS2 side, or may be in contact with the second wall 162 on the outside of the second internal space IS2. Further, the second desiccant prism 80 may be configured by enclosing a hygroscopic solid or a gel-like material in the second internal space IS2.

In addition, not only the desiccant prisms 60 and 80 but also the triangular prism 30 and the desiccant heat receiving unit 40 may be configured in the same manner.

Furthermore, the circulation structure of the hygroscopic liquid Li described in the fourth embodiment may be applied to the desiccant windows 1 to 3 described in the first to third embodiments. In this case, in the first embodiment, the triangular prism 30 and the desiccant heat receiving unit 40 are configured to have the hygroscopic liquid Li, and in the second and third embodiments, the first and second desiccant prisms 60 and 80 are configured to have the hygroscopic liquid Li.

In addition, regarding the desiccant window 3 described in the third embodiment, using the power of a motor (driving means) or the like, in a case where the first solar heat receiving unit 70 comes into contact with at least one of the second side 60b of the first desiccant prism 60 and the fifth side 80b of the second desiccant prism 80, when the circulation structure of the hygroscopic liquid Li described in the fourth embodiment is applied, the humidification and the dehumidification can be continuously performed by the movement of the first solar heat receiving unit 70, and thus the rotating mechanism 50 may be removed.

While various embodiments have been described above with reference to the drawings, it is needless to say that the present invention is not limited to such examples. It is obvious that those skilled in the art can conceive various changes or modifications within the scope of the claims, and it is understood that these naturally also belong to the technical scope of the present invention. Further, each configuration element in the above-described embodiment may be arbitrarily combined with each other within a range that does not depart from the spirit of the present invention.

This application is based on Japanese Patent Application (Japanese Patent Application No. 2017-248819) filed on Dec. 26, 2017, the contents of which are incorporated herein by reference.

What is claimed is:

1. A desiccant fitting comprising:
   a first plate configured of one or a plurality of transparent plates;
   a second plate configured of one or a plurality of plates and arranged substantially in parallel with the first plate;
   a desiccant element having hygroscopicity and disposed between the first and second plates;
   a transparent triangular prism that is disposed between the first and second plates, is configured of a first side along the first plate and second and third sides which have an angle with respect to the first side in a sectional view, and forms three types of optical paths of sunlight that directly reaches the second side, sunlight that is totally reflected on the third side and reaches the second side, and sunlight that reaches the second side after being totally reflected on the third side and the first side in order, with respect to sunlight incident through the first plate;
   a solar heat receiving unit that is installed on the second side that is a side on a lower side out of the second and third sides of the triangular prism, and receives solar heat and releases absorbed moisture by heating the desiccant element using the received heat,
   a second desiccant element configured to have a hygroscopic liquid, on an indoor side of the triangular prism, and
   wherein the desiccant element and the triangular prism integrally configure a desiccant prism,
   wherein the desiccant prism is configured to have a hygroscopic liquid, and
   wherein the hygroscopic liquid of the desiccant prism and the hygroscopic liquid of the second desiccant element are connected to each other by piping so as to be capable of circulating.

2. The desiccant fitting according to claim 1,
   wherein the second plate and the desiccant element are transparent.

3. The desiccant fitting according to claim 2, further comprising:
   a rotating mechanism that is capable of rotating a structure having the first and second plates, the desiccant element, the triangular prism, and the solar heat receiving unit, at least a half turn or more in both an up-down direction and a left-right direction,
   wherein the desiccant element and the solar heat receiving unit integrally configure a desiccant heat receiving unit, and wherein the desiccant heat receiving unit has substantially the same shape as that of the triangular prism and is disposed in a point-symmetrical direction in a sectional view.

4. The desiccant fitting according to claim 2, further comprising:
   wherein the second desiccant element is a transparent second desiccant element having hygroscopicity and disposed between the first and second plates;
   a transparent second triangular prism that is disposed between the first and second plates, is configured of a fourth side along the second plate and fifth and sixth sides having an angle with respect to the fourth side in a sectional view, and forms three types of optical paths of sunlight that directly reaches the fifth side, sunlight that is totally reflected on the sixth side and reaches the fifth side, and sunlight that reaches the fifth side after being totally reflected on the sixth side and the fourth side in order, with respect to sunlight incident through the second plate;
   a second solar heat receiving unit that is provided to be in contact with the fifth side that is a side on an upper side out of the fifth and sixth sides of the second triangular prism, and receives solar heat and releases absorbed moisture by heating the second desiccant element using the received heat; and
   a rotating mechanism that is capable of rotating a structure having the first and second plates, the desiccant element, the second desiccant element, the triangular prism, the second triangular prism, the solar heat receiving unit, and the second solar heat receiving unit, at least a half turn or more in an up-down direction,
   wherein the desiccant element and the triangular prism integrally configure a first desiccant prism,
   wherein the second desiccant element and the second triangular prism integrally configure a second desiccant prism, and
   wherein the first desiccant prism and the second desiccant prism are disposed to be point-symmetric to each other in a sectional view.

5. The desiccant fitting according to claim 2, further comprising:
   wherein the second desiccant element is a transparent second desiccant element having hygroscopicity and disposed between the first and second plates;
   a transparent second triangular prism that is disposed between the first and second plates, is configured of a fourth side along the second plate and fifth and sixth sides having an angle with respect to the fourth side in a sectional view, and forms three types of optical paths of sunlight that directly reaches the fifth side and is emitted from the fifth side, sunlight that is totally reflected on the sixth side, reaches the fifth side, and is emitted from the fifth side, and sunlight that reaches the fifth side after being totally reflected on the sixth side and the fourth side in order, and is emitted from the fifth side, with respect to sunlight incident through the second plate; and
   a rotating mechanism that is capable of rotating a structure having the first and second plates, the desiccant element, the second desiccant element, the triangular prism, the second triangular prism, and the solar heat receiving unit, at least a half turn or more in an up-down direction,
   wherein, in the triangular prism, there are three types of optical paths of sunlight that directly reaches the second side and is emitted from the second side, sunlight that is totally reflected on the third side, reaches the second side, and is emitted from the second side, and sunlight that reaches the second side after being totally reflected on the third side and the first side in order, and is emitted from the second side,
   wherein the desiccant element and the triangular prism integrally configure a first desiccant prism,
   wherein the second desiccant element and the second triangular prism integrally configure a second desiccant prism,
   wherein the second desiccant prism is disposed such that the fifth side opposes the solar heat receiving unit, and
   wherein the solar heat receiving unit is capable of coming into contact with any one of the second side of the first desiccant prism and the fifth side of the second desiccant prism, and moving between the second side and the fifth side.

6. The desiccant fitting according to claim 5,
   wherein the solar heat receiving unit comes into contact with the fifth side of the second desiccant prism when the first desiccant prism is oriented to an outdoor side by the rotation of the rotating mechanism, and comes into contact with the second side of the first desiccant prism when the second desiccant prism is oriented to the outdoor side of the rotation by the rotating mechanism.

7. The desiccant fitting according to claim 5,
   wherein the solar heat receiving unit is moved by driving means so as to come into contact with the second side of the first desiccant prism or the fifth side of the second desiccant prism.

8. The desiccant fitting according to claim 2, further comprising:
   wherein the second desiccant element is a transparent second desiccant element having the hygroscopic liquid and disposed between the first and second plates; and
   a transparent second triangular prism that is disposed between the first and second plates, is configured of a fourth side along the second plate and fifth and sixth sides having an angle with respect to the fourth side in a sectional view, and forms three types of optical paths of sunlight that directly reaches the fifth side and is emitted from the fifth side, sunlight that is totally reflected on the sixth side, reaches the fifth side, and is emitted from the fifth side, and sunlight that reaches the fifth side after being totally reflected on the sixth side and the fourth side in order, and is emitted from the fifth side, with respect to sunlight incident through the second plate,
   wherein, in the triangular prism, there are three types of optical paths of sunlight that directly reaches the second side and is emitted from the second side, sunlight that is totally reflected on the third side, reaches the second side, and is emitted from the second side, and sunlight that reaches the second side after being totally reflected on the third side and the first side in order, and is emitted from the second side,
   wherein the desiccant element and the triangular prism integrally configure a first desiccant prism,
   wherein the second desiccant element and the second triangular prism integrally configure a second desiccant prism,
   wherein the second desiccant prism is disposed such that the fifth side opposes the solar heat receiving unit, and wherein the solar heat receiving unit is moved by driving means so as to come into contact with the second side of the first desiccant prism or the fifth side of the second desiccant prism.

9. The desiccant fitting according to claim 1, wherein the desiccant element is configured to have a transparent porous member or an outer wall member which is at least one of a transparent porous member and a water vapor permeable member, and a hygroscopic liquid enclosed in a space defined by the outer wall member.

10. The desiccant fitting according to claim 4, wherein at least one of the desiccant element and the second desiccant element is configured to have a transparent porous member or an outer wall member which is at least one of a transparent porous member and a water vapor permeable member, and a hygroscopic liquid enclosed in a space defined by the outer wall member.

11. The desiccant fitting according to claim 3, further comprising:
wherein the second desiccant element and the triangular prism integrally configure a desiccant prism,
wherein the desiccant heat receiving unit is configured to have a hygroscopic liquid, and
wherein the hygroscopic liquid of the desiccant prism and the hygroscopic liquid of the desiccant heat receiving unit are connected to each other by piping so as to be capable of circulating.

12. The desiccant fitting according to claim 4, wherein the desiccant element is configured to have a hygroscopic liquid, and
wherein the hygroscopic liquid of the first desiccant prism and the hygroscopic liquid of the second desiccant prism are connected to each other by piping so as to be capable of circulating.

13. The desiccant fitting according to claim 1, further comprising:
a first pipe for sending indoor air to the hygroscopic liquid of the second desiccant element and discharging air dried by the hygroscopic liquid; and
a second pipe for discharging water vapor released from the hygroscopic liquid of the desiccant prism.

14. The desiccant fitting according to claim 1, further comprising:
a first air flow path having one end connected to an outside and extending at least in an up-down direction while being adjacent to the second plate side;
a second air flow path having one end connected to the first air flow path and the other end connected to the outside, and having one side adjacent to the first air flow path and the other side extending at least in the up-down direction while being adjacent to an indoor;
pumping means for sending air to the first air flow path; and
dripping means for dripping a liquid on an inner surface on both one side and the other side of the second air flow path.

15. A desiccant fitting comprising:
a first plate configured of one or a plurality of transparent plates;
a second plate configured of one or a plurality of plates and arranged substantially in parallel with the first plate;
a desiccant element having hygroscopicity and disposed between the first and second plates;

a transparent triangular prism that is disposed between the first and second plates, is configured of a first side along the first plate and second and third sides which have an angle with respect to the first side in a sectional view, and forms three types of optical paths of sunlight that directly reaches the second side, sunlight that is totally reflected on the third side and reaches the second side, and sunlight that reaches the second side after being totally reflected on the third side and the first side in order, with respect to sunlight incident through the first plate; and
a solar heat receiving unit that is installed on the second side that is a side on a lower side out of the second and third sides of the triangular prism, and receives solar heat and releases absorbed moisture by heating the desiccant element using the received heat,
wherein the second plate and the desiccant element are transparent,
wherein the desiccant fitting further comprises a rotating mechanism that is capable of rotating a structure having the first and second plates, the desiccant element, the triangular prism, and the solar heat receiving unit, at least a half turn or more in both an up-down direction and a left-right direction,
wherein the desiccant element and the solar heat receiving unit integrally configure a desiccant heat receiving unit, and
wherein the desiccant heat receiving unit has substantially the same shape as that of the triangular prism and is disposed in a point-symmetrical direction in a sectional view.

16. A desiccant fitting comprising:
a first plate configured of one or a plurality of transparent plates;
a second plate configured of one or a plurality of plates and arranged substantially in parallel with the first plate;
a desiccant element having hygroscopicity and disposed between the first and second plates;
a transparent triangular prism that is disposed between the first and second plates, is configured of a first side along the first plate and second and third sides which have an angle with respect to the first side in a sectional view, and forms three types of optical paths of sunlight that directly reaches the second side, sunlight that is totally reflected on the third side and reaches the second side, and sunlight that reaches the second side after being totally reflected on the third side and the first side in order, with respect to sunlight incident through the first plate; and
a solar heat receiving unit that is installed on the second side that is a side on a lower side out of the second and third sides of the triangular prism, and receives solar heat and releases absorbed moisture by heating the desiccant element using the received heat,
wherein the second plate and the desiccant element are transparent,
wherein the desiccant fitting further comprises:
a transparent second desiccant element having hygroscopicity and disposed between the first and second plates;
a transparent second triangular prism that is disposed between the first and second plates, is configured of a fourth side along the second plate and fifth and sixth sides having an angle with respect to the fourth side in a sectional view, and forms three types of optical paths of sunlight that directly reaches the fifth side, sunlight that is totally reflected on the sixth side and reaches the fifth side, and sunlight that reaches the fifth side after being totally reflected on the sixth side and the fourth side in order, with respect to sunlight incident through the second plate;

a second solar heat receiving unit that is provided to be in contact with the fifth side that is a side on an upper side out of the fifth and sixth sides of the second triangular prism, and receives solar heat and releases absorbed moisture by heating the second desiccant element using the received heat; and a rotating mechanism that is capable of rotating a structure having the first and second plates, the desiccant element, the second desiccant element, the triangular prism, the second triangular prism, the solar heat receiving unit, and the second solar heat receiving unit, at least a half turn or more in an up-down direction, wherein the desiccant element and the triangular prism integrally configure a first desiccant prism, wherein the second desiccant element and the second triangular prism integrally configure a second desiccant prism, and wherein the first desiccant prism and the second desiccant prism are disposed to be point-symmetric to each other in a sectional view.

* * * * *